US012777524B2

(12) United States Patent
Bergström et al.

(10) Patent No.: US 12,777,524 B2
(45) Date of Patent: Oct. 27, 2026

(54) RANDOM ACCESS PARTITIONING AND RANDOM ACCESS REPORT

(71) Applicant: Telefonaktiebolaget LM Ericsson (publ), Stockholm (SE)

(72) Inventors: Mattias Bergström, Sollentuna (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 281 days.

(21) Appl. No.: 18/292,072

(22) PCT Filed: Aug. 3, 2022

(86) PCT No.: PCT/IB2022/057229

§ 371 (c)(1),
(2) Date: Jan. 25, 2024

(87) PCT Pub. No.: WO2023/012705

PCT Pub. Date: Feb. 9, 2023

(65) Prior Publication Data

US 2025/0008563 A1 Jan. 2, 2025

Related U.S. Application Data

(60) Provisional application No. 63/229,243, filed on Aug. 4, 2021.

(51) Int. Cl.
*H04W 74/0833* (2024.01)
*H04W 74/0838* (2024.01)

(52) U.S. Cl.
CPC .... *H04W 74/0833* (2013.01); *H04W 74/0838* (2024.01)

(58) Field of Classification Search
None
See application file for complete search history.

(56) References Cited

U.S. PATENT DOCUMENTS 10,812,629 B2 * 10/2020 Park .......................... H04L 69/04
11,064,401 B2 * 7/2021 Xiong .................. H04B 7/0888
(Continued)

FOREIGN PATENT DOCUMENTS

WO 2020067975 A1 4/2020

OTHER PUBLICATIONS

CATT, "Further Consideration on the UE RACH Report for SN", 3GPP TSG RAN WG2#113-e, Electronic, Jan. 25-Feb. 5, 2021, R2-2100193, 6 pages.

(Continued)

*Primary Examiner* — Melvin H Pollack
(74) *Attorney, Agent, or Firm* — Sage Patent Group

(57) ABSTRACT

A communication device can indicate a random access ("RA") resource that was used by the communication device during a RA procedure. The communication device can receive a RA configuration associated to at least one feature specific RA resource configuration from a first network node. The communication device can further perform the RA procedure towards the first network node using the RA resource based on the RA configuration. The communication device can further store information indicating the RA resource that was used by the communication device during the RA procedure. The communication device can further transmit the information to a second network node.

23 Claims, 8 Drawing Sheets

(56) References Cited

U.S. PATENT DOCUMENTS

| | | | | |
|---|---|---|---|---|
| 11,212,844 | B2 * | 12/2021 | Kim | H04W 74/006 |
| 11,229,062 | B2 * | 1/2022 | Huang | H04W 74/002 |
| 11,259,306 | B2 * | 2/2022 | Koskela | H04B 7/06964 |
| 11,265,919 | B2 * | 3/2022 | Roy | H04L 27/0006 |
| 11,265,925 | B2 * | 3/2022 | Xu | H04W 74/002 |
| 11,382,136 | B2 * | 7/2022 | Deng | H04W 74/006 |
| 11,540,323 | B2 * | 12/2022 | Xu | H04W 52/36 |
| 11,564,273 | B2 * | 1/2023 | Park | H04W 76/15 |
| 11,601,980 | B2 * | 3/2023 | Shih | H04B 17/328 |
| 11,690,096 | B2 * | 6/2023 | Kim | H04W 74/02 370/329 |
| 11,743,949 | B2 * | 8/2023 | Qi | H04W 88/14 370/329 |
| 11,764,854 | B2 * | 9/2023 | Raghavan | H04B 7/0626 370/329 |
| 11,765,774 | B2 * | 9/2023 | Pan | H04W 74/0808 370/329 |
| 11,785,642 | B2 * | 10/2023 | Tsai | H04W 72/23 370/311 |
| 11,903,069 | B2 * | 2/2024 | Sengupta | H04W 72/21 |
| 12,028,909 | B2 * | 7/2024 | Selvaganapathy | H04W 72/21 |
| 12,063,702 | B2 * | 8/2024 | Park | H04W 76/11 |
| 12,095,540 | B2 * | 9/2024 | Ali | H04B 7/0639 |
| 12,150,003 | B2 * | 11/2024 | Ishii | H04W 12/043 |
| 12,177,652 | B2 * | 12/2024 | Ishii | H04W 36/362 |
| 12,219,498 | B2 * | 2/2025 | Cha | H04W 52/36 |
| 12,232,176 | B2 * | 2/2025 | Miao | H04W 74/002 |
| 12,250,716 | B2 * | 3/2025 | Kuang | H04W 74/0833 |
| 12,262,260 | B2 * | 3/2025 | Xiong | H04B 7/0626 |
| 12,342,380 | B2 * | 6/2025 | Turtinen | H04W 74/0833 |
| 12,342,381 | B2 * | 6/2025 | Tsai | H04W 74/0833 |
| 12,356,446 | B2 * | 7/2025 | Kim | H04W 72/1273 |
| 12,363,756 | B2 * | 7/2025 | Lee | H04L 5/001 |
| 12,389,458 | B2 * | 8/2025 | Roy | H04B 7/088 |
| 12,432,771 | B2 * | 9/2025 | Jeong | H04W 74/04 |
| 12,446,017 | B2 * | 10/2025 | Yi | H04W 72/0453 |
| 12,501,479 | B2 * | 12/2025 | Yi | H04W 74/002 |
| 12,513,750 | B2 * | 12/2025 | Liu | H04W 74/0841 |
| 2021/0235430 | A1 | 7/2021 | Liu et al. | |
| 2022/0386195 | A1 * | 12/2022 | Ishii | H04W 36/0069 |
| 2023/0072763 | A1 * | 3/2023 | Kim | H04W 74/0841 |
| 2023/0127485 | A1 * | 4/2023 | Sun | H04L 5/0053 370/329 |

OTHER PUBLICATIONS

CATT, "Further Discussion on RACH Report for 2-step RACH", 3GPP TSG RAN WG2#114-e meeting, Electronic meeting, May 19-27, 2021, R2-2104931, 4 pages.

Ericsson, "On other WID related SON features", 3GPP TSG-RAN WG2 #115-e, Electronic meeting, Aug. 9-27, 2021, R2-2108307, 15 pages.

Nokia et al., "Remaining Issues and New Aspects in 2-step NR UE RACH Report", 3GPP TSG RAN WG2#114 Electronic meeting, May 19-27, 2021, R2-2105477, 5 pages.

Office Action for Japanese Patent Application No. 2024-503783 dated Jan. 10, 2025, 4 pages.

International Search Report and Written Opinion of the International Searching Authority, PCT/IB2022/057229, mailed Oct. 10, 2022, 13 pages.

Qualcomm Incorporated, "Email discussion [104#45]: RACH Report—What and how to report," 3GPP TSG-RAN WG2 Meeting #105, R2-1901640, Athens, Greece, Feb. 25-Mar. 1, 2019, 18 pages.

Huawei, "(TP for SON BL CR for TS 34.473): UE RACH Report for RACH," 3GPP TSG-RAN WG3 #107-e, R3-200492, Feb. 24-Mar. 6, 2020, E-Meeting, 34 pages.

3GPP TS 38.331 V16.4.1 (Mar. 2021); 3rd Generation Partnership Project; Technical Specification Group Radio Access Network; NR; Radio Resource Control (RRC) protocol specification (Release 16), 949 pages.

* cited by examiner

```
RA-ReportList-r16 ::= SEQUENCE (SIZE (1..maxRAReport-r16)) OF RA-Report-r16

RA-Report-r16 ::=                     SEQUENCE {
    cellId-r16                            CHOICE {
        cellGlobalId-r16                      CGI-Info-Logging-r16,
        pci-arfcn-r16                         SEQUENCE {
            physCellId-r16                        PhysCellId,
            carrierFreq-r16                       ARFCN-ValueNR
        }
    },
    ra-InformationCommon-r16              RA-InformationCommon-r16           OPTIONAL,
    raPurpose-r16                         ENUMERATED {accessRelated, beamFailureRecovery,
reconfigurationWithSync, ulUnSynchronized, schedulingRequestFailure, noPUCCHResourceAvailable,
requestForOtherSI,spare9, spare8, spare7, spare6, spare5, spare4, spare3, spare2, spare1},
    ...
}

RA-InformationCommon-r16 ::=          SEQUENCE {
    absoluteFrequencyPointA-r16           ARFCN-ValueNR,
    locationAndBandwidth-r16              INTEGER (0..37949),
    subcarrierSpacing-r16                 SubcarrierSpacing,
    msg1-FrequencyStart-r16      INTEGER (0..maxNrofPhysicalResourceBlocks-1)      OPTIONAL,
    msg1-FrequencyStartCFRA-r16    INTEGER (0..maxNrofPhysicalResourceBlocks-1)      OPTIONAL,
    msg1-SubcarrierSpacing-r16     SubcarrierSpacing                                 OPTIONAL,
    msg1-SubcarrierSpacingCFRA-r16        SubcarrierSpacing   OPTIONAL,
    msg1-FDM-r16                          ENUMERATED {one, two, four, eight}      OPTIONAL,
    msg1-FDMCFRA-r16                      ENUMERATED {one, two, four, eight}      OPTIONAL,
    perRAInfoList-r16                     PerRAInfoList-r16,
    ...,
    [[
    raFeatureType-r17           ENUMERATED {RedCap, SDT, Slice-MBB, Slice-URLLC, RedCap+SDT,
RedCap+Slice-MBB, RedCap+Slice-URLLC, SDT+Slice-MBB, SDT+Slice-URLLC, Slice-MBB+Slice-URLLC}
OPTIONAL,
    ]]
}

PerRAInfoList-r16 ::= SEQUENCE (SIZE (1..200)) OF PerRAInfo-r16

PerRAInfo-r16 ::=                     CHOICE {
    perRASSBInfoList-r16                  PerRASSBInfo-r16,
    perRACSI-RSInfoList-r16               PerRACSI-RSInfo-r16
}

PerRASSBInfo-r16 ::=                  SEQUENCE {
    ssb-Index-r16                         SSB-Index,
    numberOfPreamblesSentOnSSB-r16        INTEGER (1..200),
    perRAAttemptInfoList-r16              PerRAAttemptInfoList-r16
}

PerRACSI-RSInfo-r16 ::=               SEQUENCE {
    csi-RS-Index-r16                      CSI-RS-Index,
    numberOfPreamblesSentOnCSI-RS-r16     INTEGER (1..200)
}

PerRAAttemptInfoList-r16 ::=          SEQUENCE (SIZE (1..200)) OF PerRAAttemptInfo-r16

PerRAAttemptInfo-r16 ::=              SEQUENCE {
    contentionDetected-r16                BOOLEAN                 OPTIONAL,
    dlRSRPAboveThreshold-r16              BOOLEAN                 OPTIONAL,
    ...
}
```

FIG. 1

| RA-Report Field Descriptions |
| --- |
| ***absoluteFrequencyPointA***<br>This field indicates the absolute frequency position of the reference resource block (Common RB 0). |
| ***cellID***<br>This field indicates the CGI of the cell in which the associated random access procedure was performed. |
| ***contentionDetected***<br>This field is used to indicate that contention was detected for the transmitted preamble in the given random access attempt or not. This field is not included when the UE performs random access attempt is using contention free random-access resources or when the *raPurpose* is set to *requestForOtherSI*. |
| ***csi-RS-Index***<br>This field is used to indicate the CSI-RS index corresponding to the random access attempt. |
| ***dlRSRPAboveThreshold***<br>This field is used to indicate whether the DL beam (SSB) quality associated to the random access attempt was above or below the threshold *rsrp-ThresholdSSB* in *beamFailureRecoveryConfig* in UL BWP configuration of UL BWP selected for random access procedure initiated for beam failure recovery; Otherwise, *rsrp-ThresholdSSB* in *rach-ConfigCommon* in UL BWP configuration of UL BWP selected for random access procedure. |
| ***raFeatureType***<br>**This field is used to indicate the feature type assocaited to the RA resources used by the UE at the time of performing the RA procedure. If the UE selects the RA resources associated to RedCap related RA resources, then the UE sets *RedCap* in this field, if the UE selects the RA resources associated to RedCap+SDT related RA resources, then the UE sets *RedCap+SDT* in this field and so on.** |
| ***locationAndBandwidth***<br>Frequency domain location and bandwidth of the bandwidth part associated to the random-access resources used by the UE. |
| ***numberOfPreamblesSentOnCSI-RS***<br>This field is used to indicate the total number of successive RA preambles that were transmitted on the corresponding CSI-RS. |
| ***numberOfPreamblesSentOnSSB***<br>This field is used to indicate the total number of successive RA preambles that were transmitted on the corresponding SS/PBCH block. |
| ***perRAAttemptInfoList***<br>This field provides detailed information about a random access attempt. |

FIG. 2

| RA-Report Field Descriptions |
|---|
| ***perRAInfoList***<br>This field provides detailed information about each of the random access attempts in the chronological order of the random access attempts. |
| ***perRACSI-RSInfoList***<br>This field provides detailed information about the successive random access attempts associated to the same CSI-RS. |
| ***perRASSBInfoList***<br>This field provides detailed information about the successive random access attempts associated to the same SS/PBCH block. |
| ***raPurpose***<br>This field is used to indicate the RA scenario for which the RA report entry is triggered. The RA accesses associated to Initial access from RRC_IDLE, transition from RRC-INACTIVE and the MSG3 based SI request are indicated using the indicator 'accessRelated'. The indicator *beamFailureRecovery* is used in case of successful beam failure recovery related RA procedure in the SpCell [3]. The indicator *reconfigurationWithSync* is used if the UE executes a reconfiguration with sync. The indicator *ulUnSynchronized* is used if the random access procedure is initiated in a SpCell by DL or UL data arrival during RRC_CONNECTED when the timeAlignmentTimer is not running in the PTAG or if the RA procedure is initiated in a serving cell by a PDCCH order [3]. The indicator *schedulingRequestFailure* is used in case of SR failures [3]. The indicator *noPUCCHResourceAvailable* is used when the UE has no valid SR PUCCH resources configured [3]. The indicator *requestForOtherSI* is used for MSG1 based on demand SI request. |
| ***ra-InformationCommon***<br>This field is used to indicate the common random-access related information between *RA-report* and *RLF-report*. For RA report, this field is mandatory presented. For *RLF-report*, this field is optionally included when *connectionFailureType* is set to 'hof' or when *connectionFailureType* is set to 'rlf' and the *rlf-Cause* equals to 'randomAccessProblem' or 'beamRecoveryFailure'; otherwise this field is absent. |
| ***ssb-Index***<br>This field is used to indicate the SS/PBCH index of the SS/PBCH block corresponding to the random access attempt. |
| ***subcarrierSpacing***<br>Subcarrier spacing used in the BWP associated to the random-access resources used by the UE. |

FIG. 2 (Cont.)

RANDOM ACCESS PARTITIONING AND RANDOM ACCESS REPORT

CROSS REFERENCE TO RELATED APPLICATIONS

This application is a 35 U.S.C. § 371 national stage application of PCT International Application No. PCT/IB2022/057229 filed on Aug. 3, 2022, which in turn claims domestic priority to U.S. Provisional Patent Application No. 63/229,243, filed on Aug. 4, 2021, the disclosures and content of which are incorporated by reference herein in their entirety.

TECHNICAL FIELD

The present disclosure is related to wireless communication systems and more particularly to random access ("RA") partitioning and RA report.

BACKGROUND

A random access channel ("RACH") configuration can have critical impacts on user experience and overall network performance. The RACH collision probability, and therefore access setup delays, data resuming delays from the uplink ("UL") unsynchronized state, handover delays, transition delays from radio resource control ("RRC")_INACTIVE, and beam failure recovery delays are all affected by the RACH settings. In addition, performing RACH on the most suitable downlink beam is also important and will avoid unnecessary power ramping and failed RACH attempts. This is beneficial both for the network as well as for the attempting device; it allows to avoid unnecessary interference in the network and, also, reduce the experienced delay and user equipment ("UE") energy consumption. In new radio ("NR"), a new feature allows UE (also referred to herein as a communication device) to change RACH resource during a RACH procedure, which lead to more complex behavior.

For some features there is a need for the UE to provide an indication to the network already in the random access procedure. For example, a UE may need to indicate that the UE is of a certain type or that the UE wants to apply a feature. It is discussed in 3rd Generation Partnership Project ("3GPP") that a UE of reduced capabilities (sometimes called RedCap UE) may need to indicate to the network during the random access procedure that the UE is a RedCap UE rather than a non-RedCap UE. Another example of such a feature is an indication from the UE whether the UE wants to use a Small Data Transmission ("SDT") feature.

SUMMARY

According to some embodiments, a method performed by a communication device for indicating a random access ("RA") resource that was used by the communication device during a RA procedure is provided. The method includes receiving a RA configuration associated to at least one feature specific RA resource configuration from a first network node. The method further includes performing the RA procedure towards the first network node using the RA resource based on the RA configuration. The method further includes storing information indicating the RA resource that was used by the communication device during the RA procedure. The method further includes transmitting the information to a second network node.

According to other embodiments, a method performed by a second network node for collecting information indicating a random access ("RA") resource used by a communication device during a RA procedure with a first network node is provided. The method includes transmitting a request to transmit the information indicating the RA resource used by the communication device during the RA procedure to the communication device. The method further includes, responsive to transmitting the request, receiving the information from the communication device.

According to other embodiments, a communication device, network node, computer program, computer program product, or non-transitory computer readable medium is provided for performing one of the above methods.

Certain embodiments may provide one or more of the following technical advantages. In some embodiments, the network can identify the feature specific RA performance and therefore optimize the RA performance for each of the features separately.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a diagram illustrating an example of a random access report list according to some embodiments of inventive concepts;

FIG. 2 is a table illustrating an example of random access report field descriptions according to some embodiments of inventive concepts;

DETAILED DESCRIPTION

Figure 3:
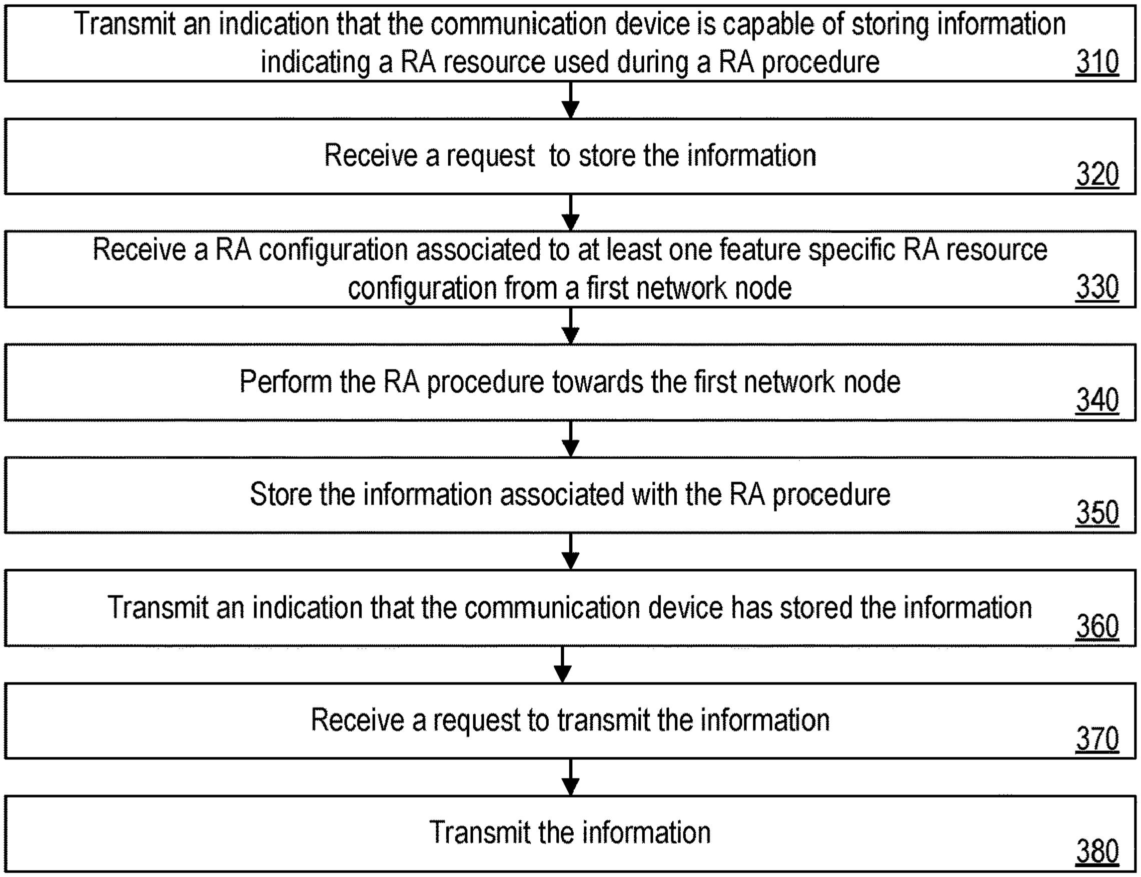
FIG. 3 is a flow chart illustrating an example of operations of a communication device according to some embodiments of inventive concepts.

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Random access ("RA") optimization is described below.

The random access channel ("RACH") configuration has critical impacts on user experience and overall network performance. The RACH collision probability, and therefore access setup delays, data resuming delays from the UL unsynchronized state, handover delays, transition delays from radio resource control ("RRC")_INACTIVE, and beam failure recovery delays are all affected by the RACH settings. In addition, performing RACH on the most suitable downlink beam is also important and will avoid unnecessary power ramping and failed RACH attempts. This is beneficial both for the network as well as for the attempting device; it allows to avoid unnecessary interference in the network and, also, reduce the experienced delay and user equipment ("UE") energy consumption. In new radio ("NR"), a new feature allows UE (also referred to herein as a communication device) to change RACH resource during a RACH procedure, which lead to more complex behavior.

The setting of RACH parameters depends on a multitude of factors. For example the factors can include the uplink inter-cell interference from the Physical Uplink Shared Channel ("PUSCH"). In additional or alternative examples, the factors include RACH load (call arrival rate, handover ("HO") rate, tracking area update, RRC_INACTIVE transition rate, the request for Other system information ("SI"), the beam failure recovery, traffic pattern and population under the cell coverage as it affects the UL synchronization states and hence the need to use random access) In additional or alternative examples, the factors include uplink ("UL") and supplementary uplink ("SUL") imbalances. In additional or alternative examples, the factors include PUSCH load. In additional or alternative examples, the factors include the cubic metric of the preambles allocated to a cell. In additional or alternative examples, the factors include whether the cell is in high-speed mode or not. In additional or alternative examples, the factors include UL and downlink (DL) imbalances.

The targets of RACH optimization are indicated as follows: (1) minimize access delays for the UEs under the coverage of popular synchronization signal blocks ("SSBs"); (2) minimize the delays for the UEs to request the other SIs; (3) minimize the imbalance of UEs access delays on UL and SUL channel; (4) minimize the beam failure recovery delays for the UEs in RRC_CONNECTED; and (5) minimize the failed/unnecessary RACH attempts on RACH resource before success.

Consequently, the RACH optimization function will attempt to automatically set several parameters related to the performance of RACH.

Automatic RACH parameter settings can be enabled by collecting the RACH report from UE and by PRACH parameters exchange between gNBs. The mechanism and content of information report/exchange for RACH optimization in long term evolution ("LTE") could be the baseline whereas taking NR new features (e.g., beam, SUL, etc) into account.

The setting of RACH parameters that can be optimized are: (1) RACH configuration (resource unit allocation); (2) RACH preamble split (among dedicated, group A, group B); (3) RACH backoff parameter value; and (4) RACH transmission power control parameters.

As a minimum, RACH optimization is realized by UE providing RACH related information report to the next generation ("NG") radio access network ("RAN") node, and by exchange of PRACH configuration of normal UL carrier and SUL carrier between NG RAN node.

For centralized unit ("CU")-distributed unit ("DU") architecture, gNB-DU should be allowed to report its RACH configuration per cell to the gNB-CU, and the gNB-CU should be allowed to signal the RACH configuration per served cell to neighboring NG RAN nodes. This allows NG-RAN nodes to identify whether RACH configurations of neighboring cells are optimized or whether changes are needed in order to achieve a better RACH coordination between neighboring cells.

Upon receiving the polling message requesting RACH report (e.g., UE Information Request message) from the NG RAN node (potentially gNB-CU of the current serving cell), UE reports RACH information within a UE Information Response message. The gNB-CU and gNB-DU take into account the RACH report and other node information, to achieve an optimized RACH configuration.

The contents of the RACH information report includes at least one of the following: Indexes of the SSBs and number of RACH preambles sent on each tried SSB listed in chronological order of attempts; the frequency (NR absolute radio frequency channel number ("ARFCN")) of tried SSBs; the beam quality of each tried SSB (i.e. beam level measurement during RACH attempts such as beam-reference signal received power ("BRSRP"), beam-reference signal received quality ("BRSRQ"), and beam-signal interference to noise ratio ("BSINR")); indication whether the selected SSB is above or below the rsrp-ThresholdSSB threshold; elapsed time from the last measurement prior to the beam selection time; number of RACH preambles sent on SUL; number of RACH preambles sent on NUL; and total number of fallbacks between Contention Based RACH Access ("CBRA") and Contention Free RACH Access ("CFRA") Contention detection indication.

The above RACH information report should also be applied to the SN node for multi-radio access technology ("MR")-dual connectivity ("DC") case.

The report of RACH information when random access procedure is performed may be requested by the network via the UE Information procedure in RRC (section 5.7.10.3 of TS 38.331 v 16.4.1), in the case where a RACH procedure was successful. Further, what information is included by the UE in the RA report is specified in section 5.7.10.5 of TS 38.331 v 16.4.1.

RA partitioning is described below.

For some features there is a need for the UE to provide an indication to the network already in the random access procedure. For example, a UE may need to indicate that the UE is of a certain type or that the UE wants to apply a feature. It is discussed in 3rd Generation Partnership Project ("3GPP") that a UE of reduced capabilities (sometimes called RedCap UE) may need to indicate to the network during the random access procedure that the UE is a RedCap UE rather than a non-RedCap UE. Another example of such a feature is an indication from the UE whether the UE wants to use a Small Data Transmission ("SDT") feature.

To provide such an indication during the random access procedure, it is discussed that the Random Access resources should be partitioned so that one partition can be dedicated to RedCap UEs and another for non-RedCap UEs.

The system may support several features which require indications during the random access procedure. For example, both support RedCap and SDT. That means that there will be several partitions to indicate combinations of features, for example: one partition for non-RedCap UEs which do not want to apply SDT; one partition for non-RedCap UEs which do want to apply SDT; one partition for RedCap UEs which do not want to apply SDT; and one partition for RedCap UEs which do want to apply SDT.

A partition of a RA resources may be that there is one time-frequency RA resource which is dedicated to one feature (or combination of features), and another time-frequency RA resources which is dedicated to another feature (or combination of features). Another possibility is that one set of preambles within a RA resource is dedicated to one feature (or combination of features) and another set of preambles within a RA resource which are dedicated to another feature (or another combination of features).

There currently exist certain challenges. The RA resource are expected to be partitioned for different use cases (e.g., RedCap, Small data enhancements, Slicing) that are being discussed in Rel-17 in RAN2. So, the UE uses a specific part of the RA resource depending on what the network's RA resource partitioning configuration looks like and what the UE's capabilities and UE's current configuration looks like.

The network might partition the RA resources in different ways and these RA resources partitioning could be changed over time to suit the type of UE distribution in the coverage area of the cell. For example, during one time duration of the day the cell might allocated different RA resources for Short Data Transmission ("SDT") and Reduced Capability ("RedCap") UEs (e.g., when there are many SDT and RedCap UEs in the coverage area of the cell) whereas during some other time duration, the cell might allocate the same RA resources for both SDT and RedCap UEs (e.g., when there are only a few SDT and RedCap UEs in the coverage area of the cell).

The network might also partition the RA resources in a way that different preambles in the same RA frequency+time resource is allocated to different features. For example, preamble 1-10 is reserved for RedCap UE whereas preamble 11-25 is for SDT UE and the preambles between 25-50 are for slice-X and the rest of the preambles are for slice-Y.

If the network wants to optimize the RA parameter optimization then the network uses the RA report to identify any issues faced by the UE while performing the RA. If the network wants to perform the RA parameter configuration optimization for a specific feature (e.g., RedCap, SDT etc.) then the network needs to know if the RA report obtained from the UE is associated to a RedCap related feature or a SDT feature etc. However, this is not possible using the existing RA report.

Certain aspects of the disclosure and their embodiments may provide solutions to these or other challenges. In some embodiments, a UE can collect the RA related information, which can include the type of feature associated to the RA resources being used by the UE and/or the detailed RA resources used by the UE.

In some embodiments, a UE may perform operations to inform the network about the feature associated to the RA resources used by the UE. The operations can include receiving a RA configuration associated to at least one feature specific RA resource configuration from a first network node. The operations can further include performing a RA procedure towards the first network node. The operations can further include storing a first information related to the RA procedure. The first information can include at least one of: the feature type associated to the used RA resource in the RA procedure; and the exact RA resource (in time, frequency and preamble dimension) used in the RA procedure. In additional or alternative embodiments, the operations can further include indicating to a second network node (could be same as first network node or another network node) about the presence of first information associated to a specific feature type. The operations can further include receiving a request to transmit the first information (optionally including explicit indication of the specific feature type) from the second network node. The operations can further include transmitting the stored first information to the second network node.

In some embodiments, a first network node may perform operations to collect information associated to the RA resources used by the UE associated to a feature type. The operations can include transmitting a RA configuration associated to at least one feature specific RA resource configuration (either broadcast or dedicated configuration). In additional or alternative embodiments, the operations can include receiving from a UE an indication about the presence of a first information associated to a specific feature type. The operations can further include transmitting a request to transmit the first information (optionally including explicit indication of the specific feature type) to the UE. The operations can further include receiving the first information from the UE.

As described above, RA resources may be partitioned into several parts where each part is mapped to a certain set of features. For example, one part of the RA resources may be used to indicate that the UE is a RedCap UE, another part may be used to indicate that the UE is using SDT, and a third part may be that the UE is a RedCap UE which is using SDT. There may be one part which is not mapped to any of these features, which is used if the UE is not a RedCap UE and is not using SDT.

As also described above, a UE may indicate to the network a report about a RA procedure that the UE has performed, for example a RA report which indicates failed RA attempts.

In a first embodiment a UE indicates to a network which RA resource the UE selected, when RA resources have been partitioned to indicate different features requested/indicated by a UE. The indication will herein be referred to as "RA partition indication".

The RA partition indication may be an indication of the set of features that were associated with the selected RA partition. Another approach is that the RA partitioning indication is an indication of a particular RA resource which the UE selected. More details below.

In some embodiments, the indication is the set of selected features. According to this approach, the UE indicates the features that the UE has selected for the RA procedure.

For example, if the UE performed a RA procedure to indicate that the UE is a RedCap UE which is using SDT, the UE would later indicate to the network that the UE was using preambles associated with RedCap+SDT.

An example flow of operations is described below. The operations can include a UE selecting a set of features the UE would like to indicate with the preamble transmission. For example, the UE may indicate that it wants to indicate RedCap+SDT. The operations can further include the UE determining a RA resource based on the selected features. The operations can further include the UE performing the RA procedure using the determined RA resource. The operations can further include the RA procedure either succeeding or failing. The operations can further include the UE logging the RA attempt. When logging the UE can log the selected set of features. The operations can further include the network requesting the log from the UE. The operations can further include the UE sending the log including indications about selected set of features.

An example of how this can be included in the RRC specification, is given below. The UE shall set the content in ra-InformationCommon as follows:

1> set the absoluteFrequencyPointA to indicate the absolute frequency of the reference resource block associated to the random-access resources used in the random-access procedure;

1>set the locationAndBandwidth and subcarrierSpacing associated to the UL BWP of the random-access resources used in the random-access procedure;
1>set the msg1-FrequencyStart, msg1-FDM and msg1-SubcarrierSpacing associated to the contention based random-access resources if used in the random-access procedure;
1>set the msg1-FrequencyStartCFRA, msg1-FDMCFRA and msg1-SubcarrierSpacingCFRA associated to the contention free random-access resources if used in the random-access procedure;
1>set the raFeatureType to the corresponding feature type associated to the random-access procedure;
1>set the parameters associated to individual random-access attempt in the chronological order of attempts in the perRAInfoList as follows:
  2>if the random-access resource used is associated to a SS/PBCH block, set the associated random-access parameters for the successive random-access attempts associated to the same SS/PBCH block for one or more random-access attempts as follows:
    3>set the ssb-Index to include the SS/PBCH block index associated to the used random-access resource;
    3>set the numberOfPreamblesSentOnSSB to indicate the number of successive random-access attempts associated to the SS/PBCH block;
    3>for each random-access attempt performed on the random-access resource, include the following parameters in the chronological order of the random-access attempt:
      4>if the random-access attempt is performed on the contention based random-access resource and if raPurpose is not equal to 'requestForOtherSI', include contentionDetected as follows:
        5>if contention resolution was not successful as specified in TS 38.321 [6] for the transmitted preamble:
          6>set the contentionDetected to true;
        5>else:
          6>set the contentionDetected to false;
      4>if the random-access attempt is performed on the contention based random-access resource; or
      4>if the random-access attempt is performed on the contention free random-access resource and if the random-access procedure was initiated due to the PDCCH ordering:
        5>if the SS/PBCH block RSRP of the SS/PBCH block corresponding to the random-access resource used in the random-access attempt is above rsrp-ThresholdSSB:
          6>set the dlRSRPAboveThreshold to true;
        5>else:
          6>set the dlRSRPAboveThreshold to false;
  2>else if the random-access resource used is associated to a CSI-RS, set the associated random-access parameters for the successive random-access attempts associated to the same CSI-RS for one or more random-access attempts as follows:
    3>set the csi-RS-Index to include the CSI-RS index associated to the used random-access resource;
    3>set the numberOfPreamblesSentOnCSI-RS to indicate the number of successive random-access attempts associated to the CSI-RS.

FIGS. 1-2 illustrate an example of a RA-ReportList and RA-Report field descriptions.

Another possibility is that the combination of features which the UE wants to indicate is indicated by a bitmap. Each bit in the bitmap may be associated to a certain feature, e.g. first bit is associated to a first feature and the second bit is associated to a second feature and so on. If the UE want to indicate that the RA procedure was for a first and fourth feature, the UE would set the first and the fourth bit in the bitmap.

According to this approach the UE indicates the RA resource, which the UE selected.

For example, if the UE performed a RA procedure to indicate that the UE is a RedCap UE which is using SDT, and if RedCap+SDT was assigned to a particular partition X of the RA resources, the UE would later indicate that the UE was performing random access using partition X.

An example flow of operations is described below. The operations can include a UE selecting a set of features the UE would like to indicate with the preamble transmission. For example, the UE may indicate that it wants to indicate RedCap+SDT. The operations can further include the UE determining a RA resource based on the selected features. The operations can further include the UE performing the RA procedure using the determined RA resource. The operations can further include the RA procedure either succeeding or failing. The operations can further include the UE logging the RA attempt. When logging the UE can log the determined RA resource. The operations can further include the network requesting the log from the UE. The operations can further include the UE sending the log including indications about the determined RA resource.

It should be noted that in a special case a certain set of features maps to several RA partitions. For example, the combination of RedCap and SDT (denoted here as RedCap+SDT) may be mapped to multiple RA partitions.

Consider for example a scenario with two RA resources: RA resource A and RA resource B. It may be so that a subset of A and a subset of B, both are mapped to RedCap+SDT. For example, preambles 1-10 in A may map to RedCap+SDT and preambles 21-25 may also map to RedCap+SDT. In such configurations, a UE which wants to indicate that the UE is a RedCap UE which is using SDT, the UE may use either preamble 1-10 in RA resource A or 21-25 in RA resource B.

If this approach is applied the UE may set the RA partition indication to indicate the particular RA resource that the UE selected (e.g. UE indicates preamble group 1-10 of RA resource A if the UE selected RA resource A, and UE indicates preamble group 21-25 of RA resource B if the UE selected RA resource B). Another approach in this special case is that the UE indicates all candidate RA resources which could be used for the set of features the UE is using (i.e. indicate both preamble group 1-10 of RA resource A and preamble group 21-25 of RA resource B).

Feature specific fetching of reports from the UE are described below.

According to this approach the network can request the UE to include the information related to the feature(s) specific RA procedures as stored by the UE. Upon receiving such a request the UE includes the stored RA procedure(s) related information associated to the requested feature(s).

According to this approach, the UE could further indicate the type of feature(s) specific RA procedure related information that the UE has stored. Upon receiving such an indication, the network could initiate the request-response procedure associated to specific feature(s).

For example, if the UE has stored information related to RA procedures while the UE is a RedCap UE which used SDT, then the UE could indicate to the network that it has stored RA related information associated to RedCap+SDT. The network can indicate in the request message that it is interested in receiving the RA procedure related information associated to RedCap+SDT and upon receiving such a request, the UE includes the RA related information associated to the RA procedure in RedCap+SDT mode.

An example flow of operations is described below. The operations can include a UE selecting a set of features the UE would like to indicate with the preamble transmission. For example, the UE may indicate that it wants to indicate RedCap+SDT. The operations can further include the UE determining a RA resource based on the selected features. The operations can further include the UE performing the RA procedure using the determined RA resource. The operations can further include the RA procedure either succeeding or failing. The operations can further include the UE logging the RA attempt. When logging the UE can log the selected set of features. The operations can further include the UE indicating to the network about the set of features for which the UE has the RA procedure related information. This indication could be included in the RRCSetupComplete, RRCResuemComplete, RRCReestablishmentComplete, or RRCReconfigurationComplete messages. The operations can further include the network requesting the set of feature related RA procedure log from the UE. The operations can further include the UE sending the feature related RA procedure log including indications.

An example of how this can be included in the RRC specification, is given below. Although only changes to RRCSetUpComplete are given below, the same changes are applicable to other RRCxxComplete messages like RRCResumeComplete, RRCReestablishmentComplete, and RRCReconfigurationComplete.

The UE shall perform the following actions upon reception of the RRCSetup:

---

...
1>set the content of RRCSetupComplete message as follows:
  2>if upper layers provide a 5G-S-TMSI:
    3>if the RRCSetup is received in response to an RRCSetupRequest:
      4>set the ng-5G-S-TMSI-Value to ng-5G-S-TMSI-Part2;
    3>else:
      4>set the ng-5G-S-TMSI-Value to ng-5G-S-TMSI;
  2>if upper layers selected an SNPN or a PLMN and in case of PLMN UE is either allowed or instructed to access the PLMN via a cell for which at least one CAG ID is broadcast:
    3>set the selectedPLMN-Identity from the npn-IdentityInfoList;
  2>else:
    3>set the selectedPLMN-Identity to the PLMN selected by upper layers from the plmn-IdentityList;
  2>if upper layers provide the ‘Registered AMF’:
    3>include and set the registeredAMF as follows:
      4>if the PLMN identity of the ‘Registered AMF’ is different from the PLMN selected by the upper layers:
        5>include the plmnIdentity in the registeredAMF and set it to the value of the PLMN identity in the ‘Registered AMF’ received from upper layers;
      4>set the amf-Identifier to the value received from upper layers;
    3>include and set the guami-Type to the value provided by the upper layers;
  2>if upper layers provide one or more S-NSSAI (see TS 23.003 [21]):
    3>include the s-NSSAI-List and set the content to the values provided by the upper layers;
  2>set the dedicatedNAS-Message to include the information received from upper layers;
  2>if connecting as an IAB-node:
    3>include the iab-NodeIndication;
  2>if the SIB1 contains idleModeMeasurementsNR and the UE has NR idle/inactive measurement information concerning cells other than the PCell available in VarMeasIdleReport; or
  2>if the SIB1 contains idleModeMeasurementsEUTRA and the UE has E-UTRA idle/inactive measurement information available in VarMeasIdleReport:
    3>include the idleMeasAvailable;

-continued

2>if the UE has logged measurements available for NR and if the RPLMN is included in plmn-IdentityList stored in VarLogMeasReport:
3>include the logMeasAvailable in the RRCSetupComplete message;
3>if Bluetooth measurement results are included in the logged measurements the UE has available for NR and if the RPLMN is included in plmn-IdentityList stored in VarLogMeasReport:
4>include the logMeasAvailableBT in the RRCSetupComplete message;
3>if WLAN measurement results are included in the logged measurements the UE has available for NR and if the RPLMN is included in plmn-IdentityList stored in VarLogMeasReport:
4>include the logMeasAvailableWLAN in the RRCSetupComplete message;
2>if the UE has connection establishment failure or connection resume failure information available in VarConnEstFailReport and if the RPLMN is equal to plmn-Identity stored in VarConnEstFailReport:
3>include connEstFailInfoAvailable in the RRCSetupComplete message;
2>if the UE has radio link failure or handover failure information available in VarRLF-Report and if the RPLMN is included in plmn-IdentityList stored in VarRLF-Report, or
2>if the UE has radio link failure or handover failure information available in VarRLF-Report of TS 36.331 [10], and if the UE is capable of cross-RAT RLF reporting and if the RPLMN is included in plmn-IdentityList stored in VarRLF-Report of TS 36.331 [10]:
3>include rlf-InfoAvailable in the RRCSetupComplete message;
2>if the UE supports storage of mobility history information and the UE has mobility history information available in VarMobilityHistoryReport:
3>include the mobilityHistoryAvail in the RRCSetupComplete message;
2>if the RRCSetup is received in response to an RRCResumeRequest, RRCResumeRequest1 or RRCSetupRequest:
3>if speedStateReselectionPars is configured in the SIB2:
4>include the mobilityState in the RRCSetupComplete message and set it to the mobility state (as specified in TS 38.304 [20]) of the UE just prior to entering RRC__CONNECTED state;
2>if the UE has random access related report available in VarRA-Report and if the RPLMN is equal to plmn-Identity stored in VarRA-Report:
3>if at least one of the RA-Report entries within the ra-ReportList included in the VarRA-Report has raFeatureType set to RedCap:
4>include the redCapRAReportAvail in the RRCSetupComplete message;
3>if at least one of the RA-Report entries within the ra-ReportList included in the VarRA-Report has raFeatureType set to SDT:
4>include the sdtRAReportAvail in the RRCSetupComplete message;
3>if at least one of the RA-Report entries within the ra-ReportList included in the VarRA-Report has raFeatureType set to Slice-MBB:
4>include the sliceMBBRAReportAvail in the RRCSetupComplete message;
3>if at least one of the RA-Report entries within the ra-ReportList included in the VarRA-Report has raFeatureType set to Slice-URLLC:
4>include the sliceURLLCRAReportAvail in the RRCSetupComplete message;
3>if at least one of the RA-Report entries within the ra-ReportList included in the VarRA-Report has raFeatureType set to RedCap+SDT:
4>include the redCapSDTRAReportAvail in the RRCSetupComplete message;
3>if at least one of the RA-Report entries within the ra-ReportList included in the VarRA-Report has raFeatureType set to RedCap+Slice-MBB:
4>include the redCapSliceMBBRAReportAvail in the RRCSetupComplete message;
3>if at least one of the RA-Report entries within the ra-ReportList included in the VarRA-Report has raFeatureType set to RedCap+Slice-URLLC:
4>include the redCapSliceURLLCRAReportAvail in the RRCSetupComplete message;
3>if at least one of the RA-Report entries within the ra-ReportList included in the VarRA-Report has raFeatureType set to SDT+Slice-MBB:
4>include the sdtSliceMBBRAReportAvail in the RRCSetupComplete message;
3>if at least one of the RA-Report entries within the ra-ReportList included in the VarRA-Report has raFeatureType set to SDT+Slice-URLLC:
4>include the sdtSliceURLLCRAReportAvail in the RRCSetupComplete message;
3>if at least one of the RA-Report entries within the ra-ReportList included in the VarRA-Report has raFeatureType set to Slice- -continued

```
      MBB+Slice-URLLC:
      4>include the sliceMBBsliceURLLCRAReportAvail in the
        RRCSetupComplete message;
1>submit the RRCSetupComplete message to lower layers for transmission,
  upon which the procedure ends.
```

An example of a network requesting a specific feature type based RA report and UE including corresponding RAReports is provided below.

Upon receiving the UEInformationRequest message, the UE shall, only after successful security activation:

```
1>if the idleModeMeasurementReq is included in the UEInformationRequest and
  the UE has stored VarMeasIdleReport that contains measurement information
  concerning cells other than the PCell:
  2>set the measResultIdleEUTRA in the UEInformationResponse message to
    the value of measReportIdleEUTRA in the VarMeasIdleReport, if available;
  2>set the measResultIdleNR in the UEInformationResponse message to the
    value of measReportIdleNR in the VarMeasIdleReport, if available;
  2>discard the VarMeasIdleReport upon successful delivery of the
    UEInformationResponse message confirmed by lower layers;
1>if the logMeasReportReq is present and if the RPLMN is included in plmn-
  IdentityList stored in VarLogMeasReport:
  2>if VarLogMeasReport includes one or more logged measurement entries,
    set the contents of the logMeasReport in the UEInformationResponse
    message as follows:
    3>include the absolute TimeStamp and set it to the value of
      absoluteTimeInfo in the VarLogMeasReport;
    3>include the traceReference and set it to the value of traceReference in
    the VarLogMeasReport,
    3>include the traceRecordingSessionRef and set it to the value of
      traceRecordingSessionRef in the VarLogMeasReport;
    3>include the tce-Id and set it to the value of tce-Id in the
      VarLogMeasReport;
    3>include the logMeasInfoList and set it to include one or more entries from
      the VarLogMeasReport starting from the entries logged first, and for
      each entry of the logMeasInfoList that is included, include all information
      stored in the corresponding logMeasInfoList entry in VarLogMeasReport;
    3>if the VarLogMeasReport includes one or more additional logged
      measurement entries that are not included in the logMeasInfoList within
      the UEInformationResponse message:
      4>include the logMeasAvailable;
      4>if bt-LocationInfo is included in locationInfo of one or more of the
        additional logged measurement entries in VarLogMeasReport that are
        not included in the logMeasInfoList within the UEInformationResponse
        message:
        5>include the logMeasAvailableBT;
      4>if wlan-LocationInfo is included in locationInfo of one or more of the
        additional logged measurement entries in VarLogMeasReport that are
        not included in the logMeasInfoList within the UEInformationResponse
        message:
        5>include the logMeasAvailableWLAN;
1>if ra-ReportReq is set to true and the UE has random access related
  information available in VarRA-Report and if the RPLMN is included in plmn-
  IdentityList stored in VarRA-Report:
  2>set the ra-ReportList in the UEInformationResponse message to the value
    of ra-ReportList in VarRA-Report;
  2>discard the ra-ReportList from VarRA-Report upon successful delivery of
    the UEInformationResponse message confirmed by lower layers;
1>if ra-ReportRedCapReq is set to true and the UE has random access
  related information available in VarRA-Report associated and if at least
  one of the RA-Report entries within the ra-ReportList included in the
  VarRA-Report has raFeature Type set to RedCap and if the RPLMN is
  included in plmn-IdentityList stored in VarRA-Report:
  2>set the ra-ReportList in the UEInformationResponse message to the
    value of RA-Report entries within ra-ReportList in VarRA-Report that
    has raFeatureType set to RedCap;
  2>discard the corresponding RA-Report entry in the ra-ReportList from
    VarRA-Report upon successful delivery of the
    UEInformationResponse message confirmed by lower layers;
1>if ra-ReportSDTReq is set to true and the UE has random access related
  information available in VarRA-Report associated and if at least one of
  the RA-Report entries within the ra-ReportList included in the VarRA-
  Report has raFeatureType set to SDT and if the RPLMN is included in
  plmn-IdentityList stored in VarRA-Report:
```

-continued

2>set the ra-ReportList in the UEInformationResponse message to the value of RA-Report entries within ra-ReportList in VarRA-Report that has raFeatureType set to SDT;
2>discard the corresponding RA-Report entry in the ra-ReportList from VarRA-Report upon successful delivery of the UEInformationResponse message confirmed by lower layers;
1>if ra-ReportSlice-MBBReq is set to true and the UE has random access related information available in VarRA-Report associated and if at least one of the RA-Report entries within the ra-ReportList included in the VarRA-Report has raFeatureType set to Slice-MBB and if the RPLMN is included in plmn-IdentityList stored in VarRA-Report:
2>set the ra-ReportList in the UEInformationResponse message to the value of RA-Report entries within ra-ReportList in VarRA-Report that has raFeatureType set to Slice-MBB;
2>discard the corresponding RA-Report entry in the ra-ReportList from VarRA-Report upon successful delivery of the UEInformationResponse message confirmed by lower layers;
1>if ra-ReportSlice-URLLCReq is set to true and the UE has random access related information available in VarRA-Report associated and if at least one of the RA-Report entries within the ra-ReportList included in the VarRA-Report has raFeatureType set to Slice-URLLC and if the RPLMN is included in plmn-IdentityList stored in VarRA-Report:
2>set the ra-ReportList in the UEInformationResponse message to the value of RA-Report entries within ra-ReportList in VarRA-Report that has raFeatureType set to Slice-URLLC;
2>discard the corresponding RA-Report entry in the ra-ReportList from VarRA-Report upon successful delivery of the UEInformationResponse message confirmed by lower layers;
1>if ra-ReportRedCapSDTReq is set to true and the UE has random access related information available in VarRA-Report associated and if at least one of the RA-Report entries within the ra-ReportList included in the VarRA-Report has raFeatureType set to RedCap+SDT and if the RPLMN is included in plmn-IdentityList stored in VarRA-Report:
2>set the ra-ReportList in the UEInformationResponse message to the value of RA-Report entries within ra-ReportList in VarRA-Report that has raFeatureType set to RedCap+SDT;
2>discard the corresponding RA-Report entry in the ra-ReportList from VarRA-Report upon successful delivery of the UEInformationResponse message confirmed by lower layers;
1>if ra-ReportRedCapSlice-MBBReq is set to true and the UE has random access related information available in VarRA-Report associated and if at least one of the RA-Report entries within the ra-ReportList included in the VarRA-Report has raFeatureType set to RedCap+Slice-MBB and if the RPLMN is included in plmn-IdentityList stored in VarRA-Report:
2>set the ra-ReportList in the UEInformationResponse message to the value of RA-Report entries within ra-ReportList in VarRA-Report that has raFeatureType set to RedCap+Slice-MBB;
2>discard the corresponding RA-Report entry in the ra-ReportList from VarRA-Report upon successful delivery of the UEInformationResponse message confirmed by lower layers;
1>if ra-ReportRedCapSlice-URLLCReq is set to true and the UE has random access related information available in VarRA-Report associated and if at least one of the RA-Report entries within the ra-ReportList included in the VarRA-Report has raFeatureType set to RedCap+Slice-URLLC and if the RPLMN is included in plmn-IdentityList stored in VarRA-Report:
2>set the ra-ReportList in the UEInformationResponse message to the value of RA-Report entries within ra-ReportList in VarRA-Report that has raFeatureType set to RedCap+Slice-URLLC;
2>discard the corresponding RA-Report entry in the ra-ReportList from VarRA-Report upon successful delivery of the UEInformationResponse message confirmed by lower layers;
1>if ra-ReportSDTSlice-MBBReq is set to true and the UE has random access related information available in VarRA-Report associated and if at least one of the RA-Report entries within the ra-ReportList included in the VarRA-Report has raFeatureType set to SDT+Slice-MBB and if the RPLMN is included in plmn-IdentityList stored in VarRA-Report:
2>set the ra-ReportList in the UEInformationResponse message to the value of RA-Report entries within ra-ReportList in VarRA-Report that has raFeatureType set to SDT+Slice-MBB;
2>discard the corresponding RA-Report entry in the ra-ReportList from VarRA-Report upon successful delivery of the UEInformationResponse message confirmed by lower layers;
1>if ra-ReportSDTpSlice-URLLCReq is set to true and the UE has random access related information available in VarRA-Report associated and if at least one of the RA-Report entries within the ra-ReportList included in the VarRA-Report has raFeatureType set to SDT+Slice-URLLC and if the RPLMN is included in plmn-IdentityList stored in VarRA-Report:

-continued

2>set the ra-ReportList in the UEInformationResponse message to the value of RA-Report entries within ra-ReportList in VarRA-Report that has raFeatureType set to SDT+Slice-URLLC;
2>discard the corresponding RA-Report entry in the ra-ReportList from VarRA-Report upon successful delivery of the UEInformationResponse message confirmed by lower layers;
1>if ra-Report Slice-MBBSlice-URLLCReq is set to true and the UE has random access related information available in VarRA-Report associated and if at least one of the RA-Report entries within the ra-ReportList included in the VarRA-Report has raFeatureType set to Slice-MBB+Slice-URLLC and if the RPLMN is included in plmn-IdentityList stored in VarRA-Report:
2>set the ra-ReportList in the UEInformationResponse message to the value of RA-Report entries within ra-ReportList in VarRA-Report that has raFeatureType set to Slice-MBB+Slice-URLLC;
2>discard the corresponding RA-Report entry in the ra-ReportList from VarRA-Report upon successful delivery of the UEInformationResponse message confirmed by lower layers;
1>if rlf-ReportReq is set to true:
2>if the UE has radio link failure information or handover failure information available in VarRLF-Report and if the RPLMN is included in plmn-IdentityList stored in VarRLF-Report:
3>set timeSinceFailure in VarRLF-Report to the time that elapsed since the last radio link failure or handover failure in NR;
3>set the rlf-Report in the UEInformationResponse message to the value of rlf-Report in VarRLF-Report;
3>discard the rif-Report from VarRLF-Report upon successful delivery of the UEInformationResponse message confirmed by lower layers;
2>else if the UE is capable of cross-RAT RLF reporting as defined in TS 38.306 [26] and has radio link failure information or handover failure information available in VarRLF-Report of TS 36.331 [10] and if the RPLMN is included in plmn-IdentityList stored in VarRLF-Report of TS 36.331 [10]:
3>set timeSinceFailure in VarRLF-Report of TS 36.331 [10] to the time that elapsed since the last radio link failure or handover failure in EUTRA;
3>set failedPCellId-EUTRA in the rlf-Report in the UEInformationResponse message to indicate the PCell in which RLF was detected or the source PCell of the failed handover in the VarRLF-Report of TS 36.331 [10];
3>set the measResult-RLF-Report-EUTRA in the rlf-Report in the UEInformationResponse message to the value of rlf-Report in VarRLF-Report of TS 36.331 [10];
3>discard the rlf-Report from VarRLF-Report of TS 36.331 [10] upon successful delivery of the UEInformationResponse message confirmed by lower layers;
1>if connEstFailReportReq is set to true and the UE has connection establishment failure or connection resume failure information in VarConnEstFailReport and if the RPLMN is equal to plmn-Identity stored in VarConnEstFailReport:
2>set timeSinceFailure in VarConnEstFailReport to the time that elapsed since the last connection establishment failure or connection resume failure in NR;
2>set the connEstFailReport in the UEInformationResponse message to the value of connEstFailReport in VarConnEstFailReport;
2>discard the connEstFailReport from VarConnEstFailReport upon successful delivery of the UEInformationResponse message confirmed by lower layers;
1>if the mobilityHistoryReportReq is set to true:
2>include the mobilityHistoryReport and set it to include entries from VarMobilityHistoryReport;
2>include in the mobilityHistoryReport an entry for the current cell, possibly after removing the oldest entry if required, and set its fields as follows:
3>set visitedCellId to the global cell identity or the physical cell identity and carrier frequency of the current cell:
3>set field timeSpent to the time spent in the current cell;
1>if the logMeasReport is included in the UEInformationResponse:
2>submit the UEInformationResponse message to lower layers for transmission via SRB2;
2>discard the logged measurement entries included in the logMeasInfoList from VarLogMeasReport upon successful delivery of the UEInformationResponse message confirmed by lower layers;
1>else:
2>submit the UEInformationResponse message to lower layers for transmission via SRB1.

In the description that follows, while the communication device may be any of the wireless device 512A, 512B, wired or wireless devices UE 512C, UE 512D, UE 600, virtualization hardware 904, virtual machines 908A, 908B, or UE 1006, the communication device 600 shall be used to describe the functionality of the operations of the communication device. Operations of the communication device 600 (implemented using the structure of the block diagram of FIG. 6) will now be discussed with reference to the flow chart of FIG. 3 according to some embodiments of inventive concepts. For example, modules may be stored in memory 610 of FIG. 6, and these modules may provide instructions so that when the instructions of a module are executed by respective communication device processing circuitry 602, processing circuitry 602 performs respective operations of the flow chart.

FIG. 3 illustrates an example of operations performed by a communication device for indicating a random access, RA, resource that was used by the communication device during a RA procedure.

At block 310, processing circuitry 602 transmits, via communication interface 612, an indication that the communication device is capable of storing information associated with a RA procedure. In some embodiments, the information includes a feature type associate with the RA resource. In additional or alternative embodiments, the information includes an identifier of the RA resource. The identifier can include at least one of: a time associate with the RA resource; a frequency associated with the RA resource; and a preamble dimension associated with the RA resource.

At block 320, processing circuitry 602 receives, via communication interface 612, a request to store the information.

At block 330, processing circuitry 602 receives a RA configuration associated to at least one feature specific RA resource configuration from a first network node.

At block 340, processing circuitry 602 performs the RA procedure towards the first network node.

At block 350, processing circuitry 602 stores the information associated with the RA procedure.

At block 360, processing circuitry 602 transmits, via communication interface 612, an indication that the communication device has stored the information.

At block 370, processing circuitry 602 receives, via communication interface 612, a request to transmit the information.

At block 380, processing circuitry 602 transmits, via communication interface 612, the information to a second network node. In some embodiments, the first network node is separate from the second network node. In other embodiments, the first network node comprises the second network node.

Various operations from the flow chart of FIG. 3 may be optional with respect to some embodiments of communication devices and related methods. Regarding methods of example embodiment 1 (set forth below), for example, operations of blocks 310, 320, 360, and 370 of FIG. 3 may be optional.

In the description that follows, while the network node may be any of the network node 510A, 510B, 700, 1006, hardware 904, or virtual machine 908A, 908B, the network node 700 shall be used to describe the functionality of the operations of the network node. Operations of the network node 700 (implemented using the structure of FIG. 7) will now be discussed with reference to the flow chart of FIG. 4 according to some embodiments of inventive concepts. For example, modules may be stored in memory 704 of FIG. 7, and these modules may provide instructions so that when the instructions of a module are executed by respective network node processing circuitry 702, processing circuitry 702 performs respective operations of the flow charts.

Figure 4:
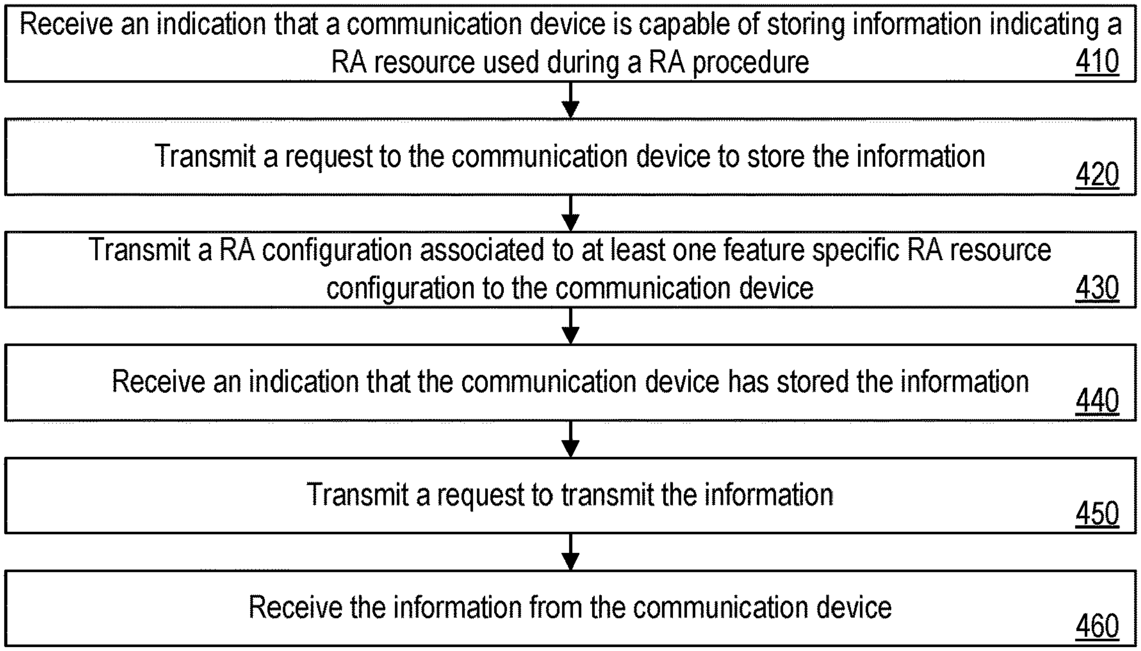
FIG. 4 is a flow chart illustrating an example of operations of a network node according to some embodiments of inventive concepts.

FIG. 4 illustrates an example of operations performed by a second network node for collecting information associated to a random access, RA, resource used by a communication device during a RA procedure with a first network node. In some embodiments, the first network node is separate from the second network node. In other embodiments, the first network node comprises the second network node.

At block 410, processing circuitry 702 receives, via communication interface 706, an indication that a communication device is capable of storing information associated with the RA procedure. In some embodiments, the information includes a feature type associate with the RA resource. In additional or alternative embodiments, the information includes an identifier of the RA resource. The identifier can include at least one of: a time associate with the RA resource; a frequency associated with the RA resource; and a preamble dimension associated with the RA resource.

At block 420, processing circuitry 702 transmits, via communication interface 706, a request to the communication device to store the information.

At block 430, processing circuitry 702 transmits, via communication interface 706, a RA configuration associated to at least one feature specific RA resource configuration to the communication device. In some embodiments, transmitting the RA configuration includes at least one of transmitting a broadcast message and a dedicated configuration.

At block 440, processing circuitry 702 receives, via communication interface 706, an indication that the communication device has stored the information.

At block 450, processing circuitry 702 transmits, via communication interface 706, a request to transmit the information.

At block 460, processing circuitry 702 receives, via communication interface 706, the information.

Figure 5:
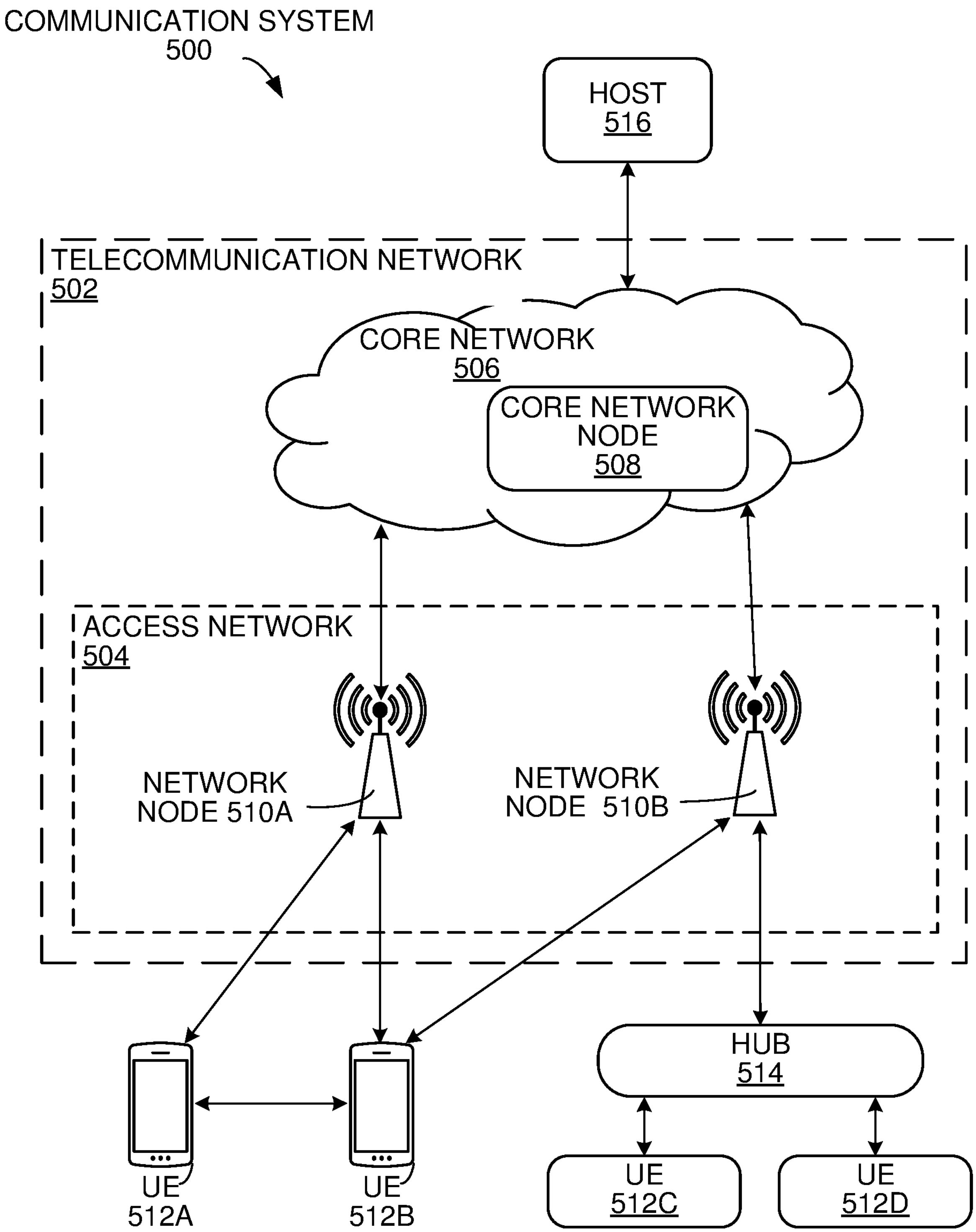
FIG. 5 is a block diagram of a communication system in accordance with some embodiments.

Various operations from the flow chart of FIG. 4 may be optional with respect to some embodiments of network nodes and related methods. Regarding methods of example embodiment 10 (set forth below), for example, operations of blocks 410, 420, 430, and 440 of FIG. 4 may be optional FIG. 5 shows an example of a communication system 500 in accordance with some embodiments.

In the example, the communication system 500 includes a telecommunication network 502 that includes an access network 504, such as a radio access network (RAN), and a core network 506, which includes one or more core network nodes 508. The access network 504 includes one or more access network nodes, such as network nodes 510*a* and 510*b* (one or more of which may be generally referred to as network nodes 510), or any other similar 3rd Generation Partnership Project (3GPP) access node or non-3GPP access point. The network nodes 510 facilitate direct or indirect connection of user equipment (UE), such as by connecting UEs 512*a*, 512*b*, 512*c*, and 512*d* (one or more of which may be generally referred to as UEs 512) to the core network 506 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 500 may include any number of wired or wireless networks, network nodes, UEs, and/or any other components or systems that may facilitate or participate in the communication of data and/or signals whether via wired or wireless connections. The communication system 500 may include and/or interface with any type of communication, telecommunication, data, cellular, radio network, and/or other similar type of system.

The UEs 512 may be any of a wide variety of communication devices, including wireless devices arranged, configured, and/or operable to communicate wirelessly with the network nodes 510 and other communication devices. Similarly, the network nodes 510 are arranged, capable, configured, and/or operable to communicate directly or indirectly with the UEs 512 and/or with other network nodes or equipment in the telecommunication network 502 to enable and/or provide network access, such as wireless network access, and/or to perform other functions, such as administration in the telecommunication network 502.

In the depicted example, the core network 506 connects the network nodes 510 to one or more hosts, such as host 516. These connections may be direct or indirect via one or more intermediary networks or devices. In other examples, network nodes may be directly coupled to hosts. The core network 506 includes one more core network nodes (e.g., core network node 508) that are structured with hardware and software components. Features of these components may be substantially similar to those described with respect to the UEs, network nodes, and/or hosts, such that the descriptions thereof are generally applicable to the corresponding components of the core network node 508. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 516 may be under the ownership or control of a service provider other than an operator or provider of the access network 504 and/or the telecommunication network 502, and may be operated by the service provider or on behalf of the service provider. The host 516 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 500 of FIG. 5 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 502 is a cellular network that implements 3GPP standardized features. Accordingly, the telecommunications network 502 may support network slicing to provide different logical networks to different devices that are connected to the telecommunication network 502. For example, the telecommunications network 502 may provide Ultra Reliable Low Latency Communication (URLLC) services to some UEs, while providing Enhanced Mobile Broadband (eMBB) services to other UEs, and/or Massive Machine Type Communication (mMTC(/Massive IoT services to yet further UEs.

In some examples, the UEs 512 are configured to transmit and/or receive information without direct human interaction. For instance, a UE may be designed to transmit information to the access network 504 on a predetermined schedule, when triggered by an internal or external event, or in response to requests from the access network 504. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 514 communicates with the access network 504 to facilitate indirect communication between one or more UEs (e.g., UE 512*c* and/or 512*d*) and network nodes (e.g., network node 510*b*). In some examples, the hub 514 may be a controller, router, content source and analytics, or any of the other communication devices described herein regarding UEs. For example, the hub 514 may be a broadband router enabling access to the core network 506 for the UEs. As another example, the hub 514 may be a controller that sends commands or instructions to one or more actuators in the UEs. Commands or instructions may be received from the UEs, network nodes 510, or by executable code, script, process, or other instructions in the hub 514. As another example, the hub 514 may be a data collector that acts as temporary storage for UE data and, in some embodiments, may perform analysis or other processing of the data. As another example, the hub 514 may be a content source. For example, for a UE that is a VR headset, display, loudspeaker or other media delivery device, the hub 514 may retrieve VR assets, video, audio, or other media or data related to sensory information via a network node, which the hub 514 then provides to the UE either directly, after performing local processing, and/or after adding additional local content. In still another example, the hub 514 acts as a proxy server or orchestrator for the UEs, in particular in if one or more of the UEs are low energy IoT devices.

The hub 514 may have a constant/persistent or intermittent connection to the network node 510*b*. The hub 514 may also allow for a different communication scheme and/or schedule between the hub 514 and UEs (e.g., UE 512*c* and/or 512*d*), and between the hub 514 and the core network 506. In other examples, the hub 514 is connected to the core network 506 and/or one or more UEs via a wired connection. Moreover, the hub 514 may be configured to connect to an M2M service provider over the access network 504 and/or to another UE over a direct connection. In some scenarios, UEs may establish a wireless connection with the network nodes 510 while still connected via the hub 514 via a wired or wireless connection. In some embodiments, the hub 514 may be a dedicated hub—that is, a hub whose primary function is to route communications to/from the UEs from/to the network node 510*b*. In other embodiments, the hub 514 may be a non-dedicated hub—that is, a device which is capable of operating to route communications between the UEs and network node 510*b*, but which is additionally capable of operating as a communication start and/or end point for certain data channels.

Figure 6:
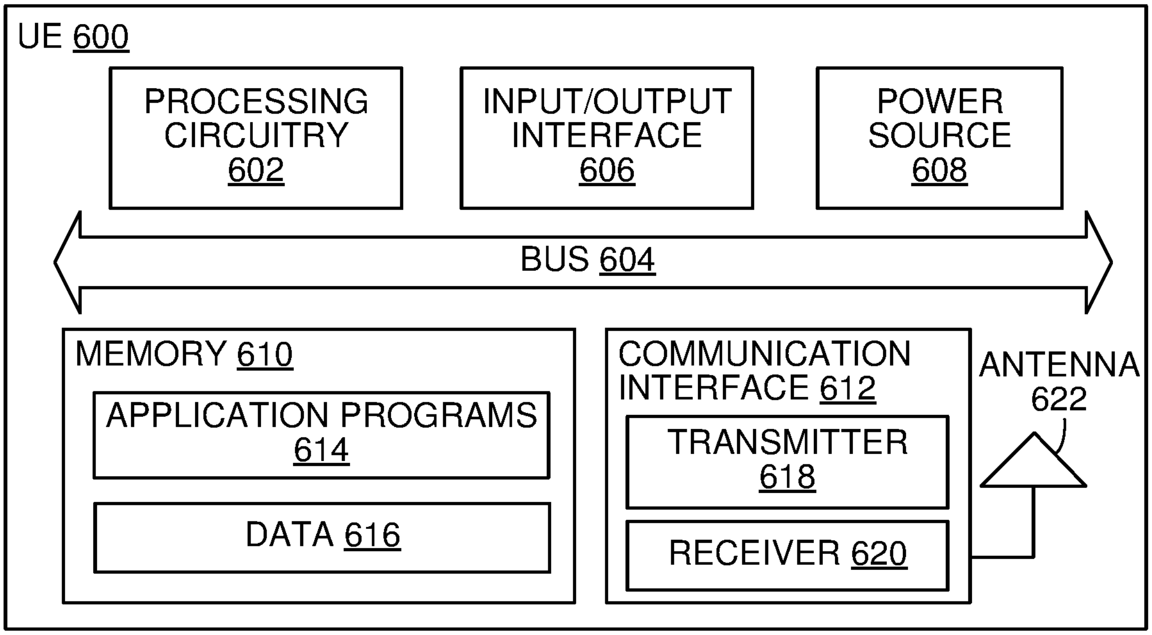
FIG. 6 is a block diagram of a user equipment in accordance with some embodiments

FIG. 6 shows a UE 600 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 600 includes processing circuitry 602 that is operatively coupled via a bus 604 to an input/output interface 606, a power source 608, a memory 610, a communication interface 612, and/or any other component, or any combination thereof. Certain UEs may utilize all or a subset of the components shown in FIG. 6. The level of integration between the components may vary from one UE to another UE. Further, certain UEs may contain multiple instances of a component, such as multiple processors, memories, transceivers, transmitters, receivers, etc.

The processing circuitry 602 is configured to process instructions and data and may be configured to implement any sequential state machine operative to execute instructions stored as machine-readable computer programs in the memory 610. The processing circuitry 602 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 602 may include multiple central processing units (CPUs).

In the example, the input/output interface 606 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 600. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 608 is structured as a battery or battery pack. Other types of power sources, such as an external power source (e.g., an electricity outlet), photovoltaic device, or power cell, may be used. The power source 608 may further include power circuitry for delivering power from the power source 608 itself, and/or an external power source, to the various parts of the UE 600 via input circuitry or an interface such as an electrical power cable. Delivering power may be, for example, for charging of the power source 608. Power circuitry may perform any formatting, converting, or other modification to the power from the power source 608 to make the power suitable for the respective components of the UE 600 to which power is supplied.

The memory 610 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 610 includes one or more application programs 614, such as an operating system, web browser application, a widget, gadget engine, or other application, and corresponding data 616. The memory 610 may store, for use by the UE 600, any of a variety of various operating systems or combinations of operating systems.

The memory 610 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 610 may allow the UE 600 to access instructions, application programs and the like, stored on transitory or non-transitory memory media, to off-load data, or to upload data. An article of manufacture, such as one utilizing a communication system may be tangibly embodied as or in the memory 610, which may be or comprise a device-readable storage medium.

The processing circuitry 602 may be configured to communicate with an access network or other network using the communication interface 612. The communication interface 612 may comprise one or more communication subsystems and may include or be communicatively coupled to an antenna 622. The communication interface 612 may include one or more transceivers used to communicate, such as by communicating with one or more remote transceivers of another device capable of wireless communication (e.g., another UE or a network node in an access network). Each transceiver may include a transmitter 618 and/or a receiver 620 appropriate to provide network communications (e.g., optical, electrical, frequency allocations, and so forth). Moreover, the transmitter 618 and receiver 620 may be coupled to one or more antennas (e.g., antenna 622) and may share circuit components, software or firmware, or alternatively be implemented separately.

In the illustrated embodiment, communication functions of the communication interface 612 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 612, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 600 shown in FIG. 6.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 7:
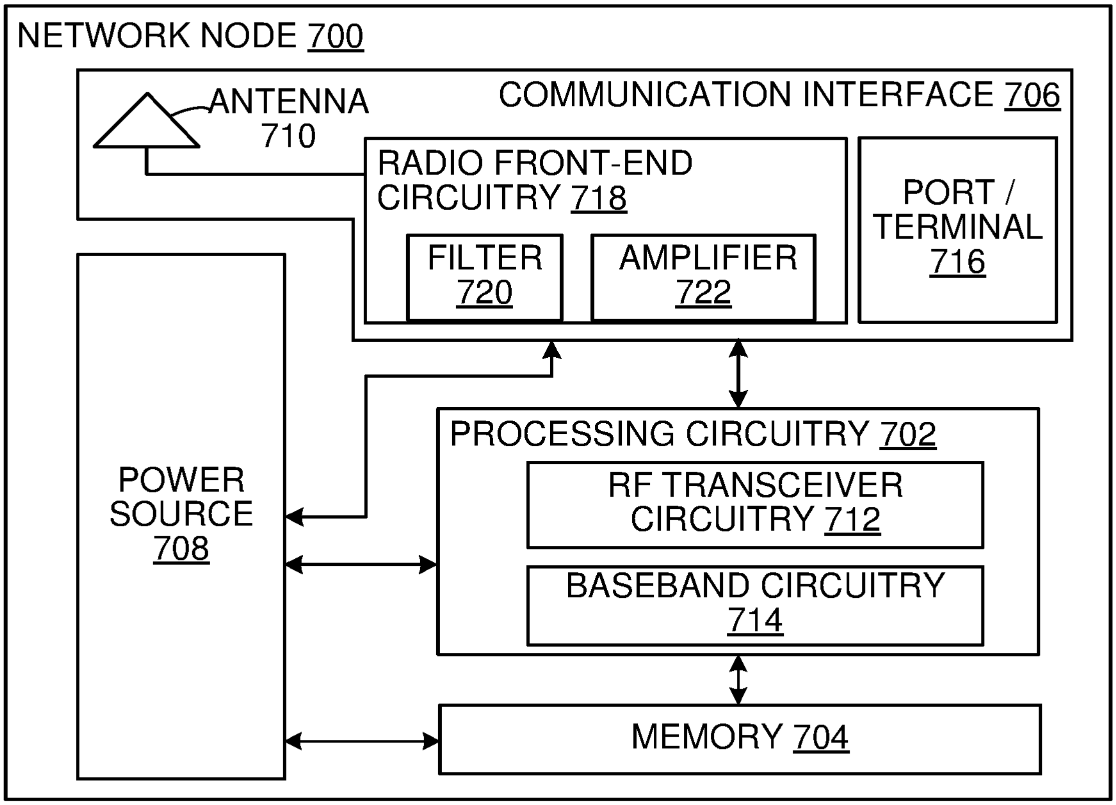
FIG. 7 is a block diagram of a network node in accordance with some embodiments.

FIG. 7 shows a network node 700 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 700 includes a processing circuitry 702, a memory 704, a communication interface 706, and a power source 708. The network node 700 may be composed of multiple physically separate components (e.g., a NodeB component and a RNC component, or a BTS component and a BSC component, etc.), which may each have their own respective components. In certain scenarios in which the network node 700 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 700 may be configured to support multiple radio access technologies (RATs). In such embodiments, some components may be duplicated (e.g., separate memory 704 for different RATs) and some components may be reused (e.g., a same antenna 710 may be shared by different RATs). The network node 700 may also include multiple sets of the various illustrated components for different wireless technologies integrated into network node 700, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 700.

The processing circuitry 702 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 700 components, such as the memory 704, to provide network node 700 functionality.

In some embodiments, the processing circuitry 702 includes a system on a chip (SOC). In some embodiments, the processing circuitry 702 includes one or more of radio frequency (RF) transceiver circuitry 712 and baseband processing circuitry 714. In some embodiments, the radio frequency (RF) transceiver circuitry 712 and the baseband processing circuitry 714 may be on separate chips (or sets of chips), boards, or units, such as radio units and digital units. In alternative embodiments, part or all of RF transceiver circuitry 712 and baseband processing circuitry 714 may be on the same chip or set of chips, boards, or units.

The memory 704 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 702. The memory 704 may store any suitable instructions, data, or information, including a computer program, software, an application including one or more of logic, rules, code, tables, and/or other instructions capable of being executed by the processing circuitry 702 and utilized by the network node 700. The memory 704 may be used to store any calculations made by the processing circuitry 702 and/or any data received via the communication interface 706. In some embodiments, the processing circuitry 702 and memory 704 is integrated.

The communication interface 706 is used in wired or wireless communication of signaling and/or data between a network node, access network, and/or UE. As illustrated, the communication interface 706 comprises port(s)/terminal(s) 716 to send and receive data, for example to and from a network over a wired connection. The communication interface 706 also includes radio front-end circuitry 718 that may be coupled to, or in certain embodiments a part of, the antenna 710. Radio front-end circuitry 718 comprises filters 720 and amplifiers 722. The radio front-end circuitry 718 may be connected to an antenna 710 and processing circuitry 702. The radio front-end circuitry may be configured to condition signals communicated between antenna 710 and processing circuitry 702. The radio front-end circuitry 718 may receive digital data that is to be sent out to other network nodes or UEs via a wireless connection. The radio front-end circuitry 718 may convert the digital data into a radio signal having the appropriate channel and bandwidth parameters using a combination of filters 720 and/or amplifiers 722. The radio signal may then be transmitted via the antenna 710. Similarly, when receiving data, the antenna 710 may collect radio signals which are then converted into digital data by the radio front-end circuitry 718. The digital data may be passed to the processing circuitry 702. In other embodiments, the communication interface may comprise different components and/or different combinations of components.

In certain alternative embodiments, the network node 700 does not include separate radio front-end circuitry 718, instead, the processing circuitry 702 includes radio front-end circuitry and is connected to the antenna 710. Similarly, in some embodiments, all or some of the RF transceiver circuitry 712 is part of the communication interface 706. In still other embodiments, the communication interface 706 includes one or more ports or terminals 716, the radio front-end circuitry 718, and the RF transceiver circuitry 712, as part of a radio unit (not shown), and the communication interface 706 communicates with the baseband processing circuitry 714, which is part of a digital unit (not shown).

The antenna 710 may include one or more antennas, or antenna arrays, configured to send and/or receive wireless signals. The antenna 710 may be coupled to the radio front-end circuitry 718 and may be any type of antenna capable of transmitting and receiving data and/or signals wirelessly. In certain embodiments, the antenna 710 is separate from the network node 700 and connectable to the network node 700 through an interface or port.

The antenna 710, communication interface 706, and/or the processing circuitry 702 may be configured to perform any receiving operations and/or certain obtaining operations described herein as being performed by the network node. Any information, data and/or signals may be received from a UE, another network node and/or any other network equipment. Similarly, the antenna 710, the communication interface 706, and/or the processing circuitry 702 may be configured to perform any transmitting operations described herein as being performed by the network node. Any information, data and/or signals may be transmitted to a UE, another network node and/or any other network equipment.

The power source 708 provides power to the various components of network node 700 in a form suitable for the respective components (e.g., at a voltage and current level needed for each respective component). The power source 708 may further comprise, or be coupled to, power management circuitry to supply the components of the network node 700 with power for performing the functionality described herein. For example, the network node 700 may be connectable to an external power source (e.g., the power grid, an electricity outlet) via an input circuitry or interface such as an electrical cable, whereby the external power source supplies power to power circuitry of the power source 708. As a further example, the power source 708 may comprise a source of power in the form of a battery or battery pack which is connected to, or integrated in, power circuitry. The battery may provide backup power should the external power source fail.

Embodiments of the network node 700 may include additional components beyond those shown in FIG. 7 for providing certain aspects of the network node's functionality, including any of the functionality described herein and/or any functionality necessary to support the subject matter described herein. For example, the network node 700 may include user interface equipment to allow input of information into the network node 700 and to allow output of information from the network node 700. This may allow a user to perform diagnostic, maintenance, repair, and other administrative functions for the network node 700.

Figure 8:
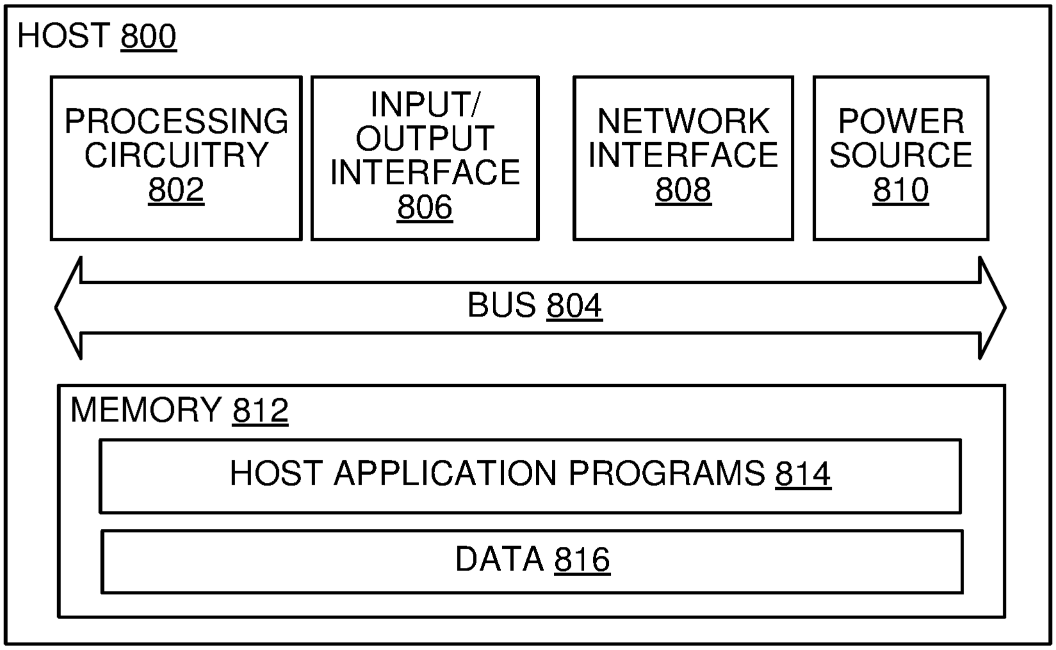
FIG. 8 is a block diagram of a host computer communicating with a user equipment in accordance with some embodiments.

FIG. 8 is a block diagram of a host 800, which may be an embodiment of the host 516 of FIG. 5, in accordance with various aspects described herein. As used herein, the host 800 may be or comprise various combinations hardware and/or software, including a standalone server, a blade server, a cloud-implemented server, a distributed server, a virtual machine, container, or processing resources in a server farm. The host 800 may provide one or more services to one or more UEs.

The host 800 includes processing circuitry 802 that is operatively coupled via a bus 804 to an input/output interface 806, a network interface 808, a power source 810, and a memory 812. Other components may be included in other embodiments. Features of these components may be substantially similar to those described with respect to the devices of previous figures, such as FIGS. 6 and 7, such that the descriptions thereof are generally applicable to the corresponding components of host 800.

The memory 812 may include one or more computer programs including one or more host application programs 814 and data 816, which may include user data, e.g., data generated by a UE for the host 800 or data generated by the host 800 for a UE. Embodiments of the host 800 may utilize only a subset or all of the components shown. The host application programs 814 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 814 may also provide for user authentication and licensing checks and may periodically report health, routes, and content availability to a central node, such as a device in or on the edge of a core network. Accordingly, the host 800 may select and/or indicate a different host for over-the-top services for a UE. The host application programs 814 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 9:
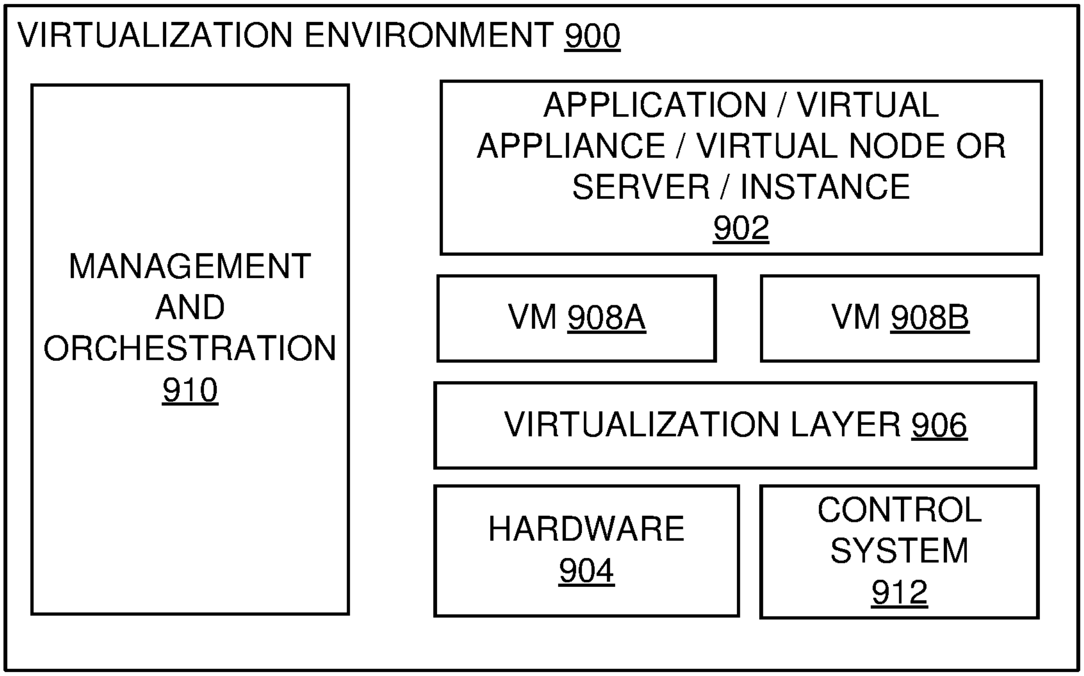
FIG. 9 is a block diagram of a virtualization environment in accordance with some embodiments.

FIG. 9 is a block diagram illustrating a virtualization environment 900 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 900 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 902 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 904 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 906 (also referred to as hypervisors or virtual machine monitors (VMMs)), provide VMs 908*a* and 908*b* (one or more of which may be generally referred to as VMs 908), and/or perform any of the functions, features and/or benefits described in relation with some embodiments described herein. The virtualization layer 906 may present a virtual operating platform that appears like networking hardware to the VMs 908.

The VMs 908 comprise virtual processing, virtual memory, virtual networking or interface and virtual storage, and may be run by a corresponding virtualization layer 906. Different embodiments of the instance of a virtual appliance 902 may be implemented on one or more of VMs 908, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 908 may be a software implementation of a physical machine that runs programs as if they were executing on a physical, non-virtualized machine. Each of the VMs 908, and that part of hardware 904 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 908 on top of the hardware 904 and corresponds to the application 902.

Hardware 904 may be implemented in a standalone network node with generic or specific components. Hardware 904 may implement some functions via virtualization. Alternatively, hardware 904 may be part of a larger cluster of hardware (e.g. such as in a data center or CPE) where many hardware nodes work together and are managed via management and orchestration 910, which, among others, oversees lifecycle management of applications 902. In some embodiments, hardware 904 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 912 which may alternatively be used for communication between hardware nodes and radio units.

Figure 10:
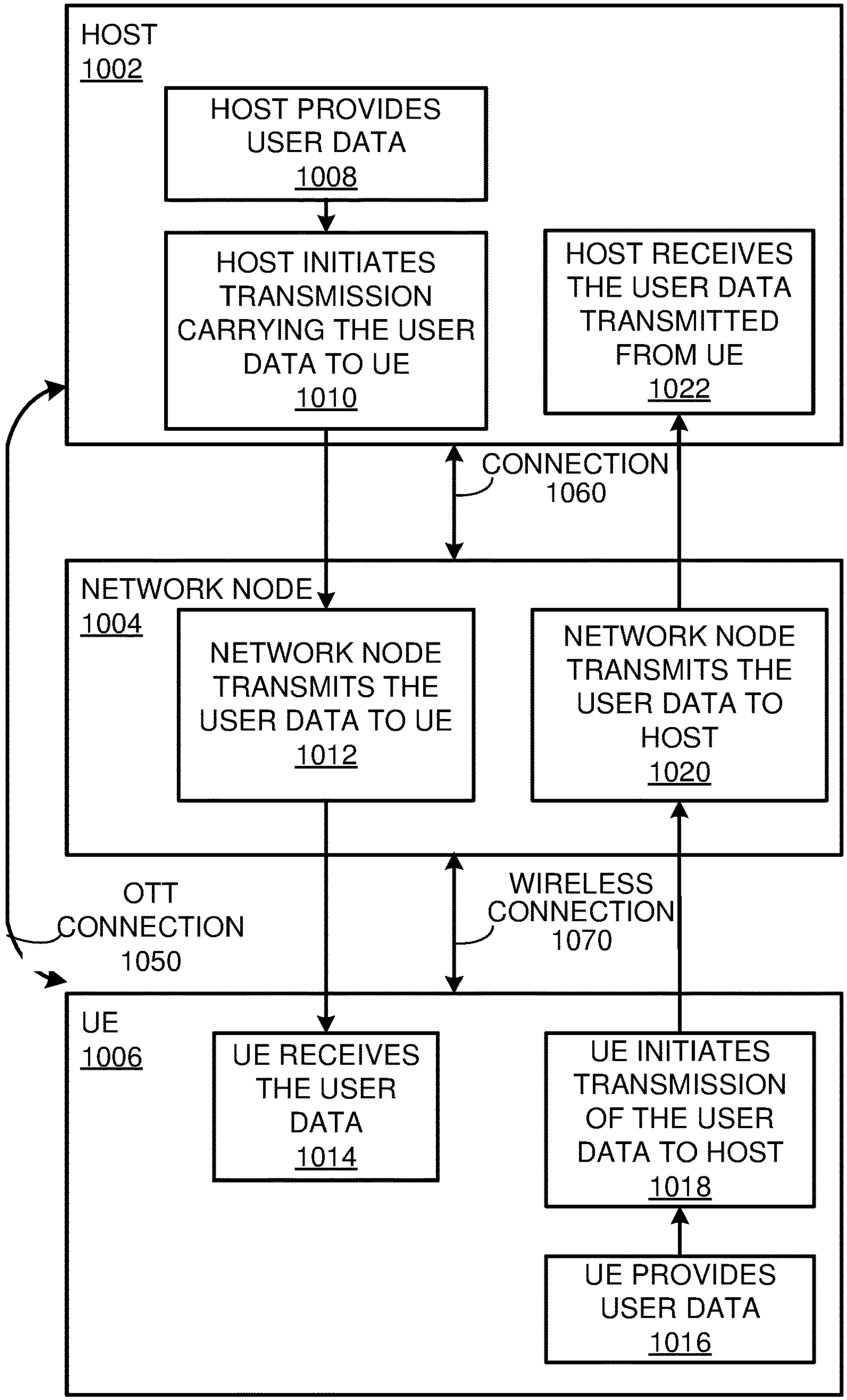
FIG. 10 is a block diagram of a host computer communicating via a base station with a user equipment over a partially wireless connection in accordance with some embodiments in accordance with some embodiments.

FIG. 10 shows a communication diagram of a host 1002 communicating via a network node 1004 with a UE 1006 over a partially wireless connection in accordance with some embodiments. Example implementations, in accordance with various embodiments, of the UE (such as a UE 512*a* of FIG. 5 and/or UE 600 of FIG. 6), network node (such as network node 510*a* of FIG. 5 and/or network node 700 of FIG. 7), and host (such as host 516 of FIG. 5 and/or host 800 of FIG. 8) discussed in the preceding paragraphs will now be described with reference to FIG. 10.

Like host 800, embodiments of host 1002 include hardware, such as a communication interface, processing circuitry, and memory. The host 1002 also includes software, which is stored in or accessible by the host 1002 and executable by the processing circuitry. The software includes a host application that may be operable to provide a service to a remote user, such as the UE 1006 connecting via an over-the-top (OTT) connection 1050 extending between the UE 1006 and host 1002. In providing the service to the remote user, a host application may provide user data which is transmitted using the OTT connection 1050.

The network node 1004 includes hardware enabling it to communicate with the host 1002 and UE 1006. The connection 1060 may be direct or pass through a core network (like core network 506 of FIG. 5) and/or one or more other intermediate networks, such as one or more public, private, or hosted networks. For example, an intermediate network may be a backbone network or the Internet.

The UE 1006 includes hardware and software, which is stored in or accessible by UE 1006 and executable by the UE's processing circuitry. The software includes a client application, such as a web browser or operator-specific "app" that may be operable to provide a service to a human or non-human user via UE 1006 with the support of the host 1002. In the host 1002, an executing host application may communicate with the executing client application via the OTT connection 1050 terminating at the UE 1006 and host 1002. In providing the service to the user, the UE's client application may receive request data from the host's host application and provide user data in response to the request data. The OTT connection 1050 may transfer both the request data and the user data. The UE's client application may interact with the user to generate the user data that it provides to the host application through the OTT connection 1050.

The OTT connection 1050 may extend via a connection 1060 between the host 1002 and the network node 1004 and via a wireless connection 1070 between the network node 1004 and the UE 1006 to provide the connection between the host 1002 and the UE 1006. The connection 1060 and wireless connection 1070, over which the OTT connection 1050 may be provided, have been drawn abstractly to illustrate the communication between the host 1002 and the UE 1006 via the network node 1004, without explicit reference to any intermediary devices and the precise routing of messages via these devices.

As an example of transmitting data via the OTT connection 1050, in step 1008, the host 1002 provides user data, which may be performed by executing a host application. In some embodiments, the user data is associated with a particular human user interacting with the UE 1006. In other embodiments, the user data is associated with a UE 1006 that shares data with the host 1002 without explicit human interaction. In step 1010, the host 1002 initiates a transmission carrying the user data towards the UE 1006. The host 1002 may initiate the transmission responsive to a request transmitted by the UE 1006. The request may be caused by human interaction with the UE 1006 or by operation of the client application executing on the UE 1006. The transmission may pass via the network node 1004, in accordance with the teachings of the embodiments described throughout this disclosure. Accordingly, in step 1012, the network node 1004 transmits to the UE 1006 the user data that was carried in the transmission that the host 1002 initiated, in accordance with the teachings of the embodiments described throughout this disclosure. In step 1014, the UE 1006 receives the user data carried in the transmission, which may be performed by a client application executed on the UE 1006 associated with the host application executed by the host 1002.

In some examples, the UE 1006 executes a client application which provides user data to the host 1002. The user data may be provided in reaction or response to the data received from the host 1002. Accordingly, in step 1016, the UE 1006 may provide user data, which may be performed by executing the client application. In providing the user data, the client application may further consider user input received from the user via an input/output interface of the UE 1006. Regardless of the specific manner in which the user data was provided, the UE 1006 initiates, in step 1018, transmission of the user data towards the host 1002 via the network node 1004. In step 1020, in accordance with the teachings of the embodiments described throughout this disclosure, the network node 1004 receives user data from the UE 1006 and initiates transmission of the received user data towards the host 1002. In step 1022, the host 1002 receives the user data carried in the transmission initiated by the UE 1006.

One or more of the various embodiments improve the performance of OTT services provided to the UE 1006 using the OTT connection 1050, in which the wireless connection 1070 forms the last segment. More precisely, the teachings of these embodiments may allow a network to identify the features specific RA performance and therefore optimize the RA performance for each of the features separately.

In an example scenario, factory status information may be collected and analyzed by the host 1002. As another example, the host 1002 may process audio and video data which may have been retrieved from a UE for use in creating maps. As another example, the host 1002 may collect and analyze real-time data to assist in controlling vehicle congestion (e.g., controlling traffic lights). As another example, the host 1002 may store surveillance video uploaded by a UE. As another example, the host 1002 may store or control access to media content such as video, audio, VR or AR which it can broadcast, multicast or unicast to UEs. As other examples, the host 1002 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 1050 between the host 1002 and UE 1006, in response to variations in the measurement results. The measurement procedure and/or the network functionality for reconfiguring the OTT connection may be implemented in software and hardware of the host 1002 and/or UE 1006. In some embodiments, sensors (not shown) may be deployed in or in association with other devices through which the OTT connection 1050 passes; the sensors may participate in the measurement procedure by supplying values of the monitored quantities exemplified above, or supplying values of other physical quantities from which software may compute or estimate the monitored quantities. The reconfiguring of the OTT connection 1050 may include message format, retransmission settings, preferred routing etc.; the reconfiguring need not directly alter the operation of the network node 1004. Such procedures and functionalities may be known and practiced in the art. In certain embodiments, measurements may involve proprietary UE signaling that facilitates measurements of throughput, propagation times, latency and the like, by the host 1002. The measurements may be implemented in that software causes messages to be transmitted, in particular empty or 'dummy' messages, using the OTT connection 1050 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

What is claimed is:

1. A method performed by a communication device for indicating a random access (RA) resource that was used by the communication device during a RA procedure, the method comprising:
- receiving a RA configuration associated with at least one feature specific RA resource configuration from a first network node;
- performing the RA procedure towards the first network node using the RA resource based on the RA configuration;
- storing information indicating the RA resource that was used by the communication device during the RA procedure; and
- transmitting the information to a second network node.

2. The method of claim 1, wherein the RA resource indicates that the communication device is of a certain type or wants to apply a feature and the information comprises a feature type associated with the RA resource that was used in the RA procedure.

3. The method of claim 1, wherein the information comprises an identifier of the RA resource that was used in the RA procedure.

4. The method of claim 3, wherein the identifier comprises at least one of:
- a time associated with the RA resource;
- a frequency associated with the RA resource; and
- a preamble dimension associated with the RA resource.

5. The method of claim 1, wherein the first network node is separate from the second network node.

6. The method of claim 1, wherein the first network node comprises the second network node.

7. The method of claim 1, further comprising:
- transmitting, to the second network node, an indication that the communication device is capable of storing the information.

8. The method of claim 1, further comprising:
- receiving a request from the second network node to store the information.

9. The method of claim 1, further comprising at least one of:
- transmitting an indication that the communication device has stored the information to the second network node; and
- transmitting an indication that the communication device has stored information associated to a feature specific RA procedure.

10. The method of claim 1, further comprising at least one of:
- receiving a request from the second network node to transmit the information; and
- receiving a request from the second network node to transmit information associated to a specific feature type, wherein transmitting the information to the second network node comprises transmitting the information to the second network node in response to receiving the request from the second network node.

11. A method performed by a second network node for collecting information indicating a random access (RA) resource used by a communication device during a RA procedure with a first network node, the method comprising:

transmitting, to the communication device, a request to transmit the information indicating the RA resource used by the communication device during the RA procedure; and responsive to transmitting the request, receiving the information from the communication device.

12. The method of claim 11, wherein the RA resource indicates that the communication device is of a certain type or wants to apply a feature and the information comprises a feature type associated to the RA resource.

13. The method of claim 11, wherein the information comprises an identifier of the RA resource.

14. The method of claim 13, wherein the identifier comprises at least one of:

a time associated with the RA resource; a frequency associated with the RA resource; and a preamble dimension associated with the RA resource.

15. The method of claim 11, wherein first network node is separate from the second network node.

16. The method of claim 11, wherein the first network node comprises the second network node.

17. The method of claim 16, further comprising:

transmitting, to the communication device, a RA configuration associated with at least one feature specific RA resource configuration.

18. The method of claim 17, wherein transmitting the RA configuration comprises at least one of transmitting a broadcast message and a dedicated configuration.

19. The method of claim 11, further comprising:

receiving, from the communication device, an indication that the communication device is capable of storing the information.

20. The method of claim 11, further comprising:

transmitting a request to the communication device to store the information.

21. The method of claim 11, further comprising at least one of:

receiving, from the communication device, an indication that the communication device has stored the information; and receiving, from the communication device, an indication that the communication device has stored information associated to a feature specific RA procedure.

22. A communication device for indicating a random access (RA) resource that was used by the communication device during a RA procedure, the communication device comprising:

processing circuitry; and memory coupled to the processing circuitry and having instructions stored therein that are executable by the processing circuitry to cause the communication device to perform operations comprising to:

receive a RA configuration associated to at least one feature specific RA resource configuration from a first network node;

perform the RA procedure towards the first network node using the RA resource based on the RA configuration;

store information indicating the RA resource that was used by the communication device during the RA procedure; and transmit the information to a second network node.

23. A network node for collecting information associated to a random access (RA) resource used by a communication device during a RA procedure, the network node comprising:

processing circuitry; and memory coupled to the processing circuitry and having instructions stored therein that are executable by the processing circuitry to cause the network node to perform operations comprising to:

transmit, to the communication device, a request to transmit the information indicating the RA resource used by the communication device during the RA procedure; and responsive to transmitting the request, receive the information from the communication device.

* * * * *